(12) United States Patent
Gao et al.

(10) Patent No.: US 9,374,814 B2
(45) Date of Patent: Jun. 21, 2016

(54) DCI TRANSMISSION METHOD AND DEVICE UNDER CROSS-BAND CARRIER AGGREGATION

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 11 days.

(21) Appl. No.: 14/412,608

(22) PCT Filed: Jul. 4, 2013

(86) PCT No.: PCT/CN2013/078799
§ 371 (c)(1),
(2) Date: Feb. 25, 2015

(87) PCT Pub. No.: WO2014/005529
PCT Pub. Date: Jan. 9, 2014

(65) Prior Publication Data
US 2016/0044638 A1 Feb. 11, 2016

(30) Foreign Application Priority Data

Jul. 4, 2012 (CN) .......................... 2012 1 0230592

(51) Int. Cl.
*H04W 72/04* (2009.01)
*H04L 1/18* (2006.01)
(Continued)

(52) U.S. Cl.
CPC ........... *H04W 72/042* (2013.01); *H04L 1/1896* (2013.01); *H04L 5/001* (2013.01);
(Continued)

(58) Field of Classification Search
None
See application file for complete search history.

(56) References Cited

FOREIGN PATENT DOCUMENTS

| CN | 102036405 | 4/2011 |
| CN | 102201885 | 9/2011 |

(Continued)

OTHER PUBLICATIONS

Written Opinion of the International Searching Authority for PCT/CN2013/078799 mailed Oct. 17, 2013.
(Continued)

*Primary Examiner* — Chi H Pham
*Assistant Examiner* — Shick Hom
(74) *Attorney, Agent, or Firm* — Foley & Lardner LLP; James F. Ewing; Paul M. Pua

(57) ABSTRACT

The present application relates to the field of communications, and disclosed are a DCI transmission method and device under cross-band carrier aggregation. The method is: for LTE-A UE which aggregates carriers having different TDD uplink/downlink configurations, according to a pre-arranged rule or high-layer signaling configuration information, determining whether a DAI and a UL index are contained in a DCI format which is used by a PDCCH for scheduling a PUSCH, and determining a CSS and a USS respectively and separately. Accordingly, it can be ensured that the size of a DCI which is transmitted in a CSS does not change, thus ensuring the normal transmission of common cell information, and at the same time, in a USS, according to the actual needs, a specific bit field in the DCI can be determined rationally, thus supporting the UL multi-frame scheduling and/or the resource overhead control of an ACK/NACK over a PUSCH.

20 Claims, 4 Drawing Sheets

(51) Int. Cl.
  *H04L 5/00*    (2006.01)
  *H04L 5/14*    (2006.01)
  *H04W 72/12*   (2009.01)
  *H04J 3/00*    (2006.01)
  *H04L 1/00*    (2006.01)
  *H04W 88/02*   (2009.01)

(52) U.S. Cl.
  CPC .............. *H04L 5/0053* (2013.01); *H04L 5/14* (2013.01); *H04W 72/0453* (2013.01); *H04W 72/1284* (2013.01); *H04J 3/00* (2013.01); *H04L 1/0038* (2013.01); *H04W 88/02* (2013.01)

(56) References Cited

FOREIGN PATENT DOCUMENTS

| | | |
|---|---|---|
| CN | 102263620 | 11/2011 |
| CN | 102395206 | 3/2012 |
| WO | WO-2012/020954 | 2/2012 |

OTHER PUBLICATIONS

Extended European Search Report for EP Application No. 13812555.4 mailed Sep. 28, 2015.

Fujitsu et al: "DCI format padding in LTE", 3GPP Draft; RI-111719, 3rd Generation Partnership Project (3GPP), Mobile Competence Centre ; 650, Route Des Lucioles ; F-06921 Sophia-Antipolis Cedex; France, vol. RAN WGI, No. Barcelona, Spain; May 9, 2011, May 5, 2011, XP050491409, [retrieved on May 5, 2011].

Huawei et al: "Control signalling design for UL MIMO", 3GPP Draft; RI-105136, 3rd Generation Partnership Project (3GPP), Mobile Competence Centre, 650, Route Des Lucioles ; F-06921 Sophia-Antipolis Cedex, France,Vo 1. RAN WGI, No. Xi'an; Oct. 11, 2010, Oct. 5, 2010, XP050450356, [retrieved on Oct. 5, 2010].

International Search Report for PCT/CN2013/078799 mailed Oct. 17, 2013.

Catt, Methods to support different UL/DL reconfiguration time scales for FS_LTE_TDD_eIMTA, 3GPP TSG-RAN WG1#69, R1-122062, Prague, Czech Republic, May 21-25, 2012.

LG Electronics, TDD DL-UL Reconfiguration Methods in Carrier Aggregation, 3GPP TSG-RAN WG1#69, R1-122872, Prague, Czech Republic, May 21-25, 2012.

DCI TRANSMISSION METHOD AND DEVICE UNDER CROSS-BAND CARRIER AGGREGATION

This application is a US National Stage of International Application No. PCT/CN2013/078799, filed on Jul. 4, 2013, designating the United States, and claiming the benefit of Chinese Patent Application No. 201210230592.7, filed with the Chinese Patent Office on Jul. 4, 2012 and entitled "Method of and device for transmitting DCI in inter-band carrier aggregation", which is hereby incorporated by reference in its entirety.

FIELD OF THE INVENTION

The present invention relates to the field of communications and particularly to a method of and device for transmitting DCI in inter-band carrier aggregation.

BACKGROUND OF THE INVENTION

In a Long Term Evolution (LTE) system, seven TDD uplink/downlink configurations are defined for each Time Division Duplex (TDD) radio frame, particularly as depicted in Table 1, where D represents a downlink sub-frame, U represents an uplink sub-frame, and S represents a special sub-frame. The special sub-frame is composed of three components including a Downlink Pilot Time Slot (DwPTS), a Guard Period (GP) and an Uplink Pilot Time Slot (UpPTS).

TABLE 1

| Uplink/downlink configuration | Downlink to uplink switching periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

There are significantly improved system peak rates in a Long Term Evolution-Advanced (LTE-A) system as compared with the LTE system, and a bandwidth available to a User Equipment (UE) needs to be extended by aggregating together a plurality of consecutive or inconsecutive carriers to serve the UE concurrently, particularly as illustrated in FIG. 1. These carriers aggregated together are referred to as component carriers. Each cell can be a component carrier.

In the Rel-10 system, the same TDD uplink/downlink configuration applies to a plurality of component carriers aggregated for the UE, and the UE is notified of the configuration via a System Information Block-1 (SIB-1), so the configuration can also be referred simply to as an SIB-1 TDD uplink/downlink configuration. In The Rel-11 and releases subsequent thereto, a Carrier Aggregation (CA)-enabled UE can share or access an adjacent band with another system. As illustrated in FIG. 2, for example, three carriers are aggregated for the UE: the carrier 1 and the carrier 2 are located in the band 1 and the carrier 3 is located in the band 2. In order to avoid uplink/downlink cross interference between the adjacent TDD systems, the same TDD uplink/downlink configuration as the 3G/LTE TDD band A shall apply to the carrier 1 and the carrier 2, and the same TDD uplink/downlink configuration as the 3G/LTE TDD band B shall apply to the carrier 3. When there are different TDD uplink/downlink configurations in the band A and the band B, the TDD uplink/downlink configuration of the carriers 1 and 2 is different from the TDD uplink/downlink configuration of the carrier 3, where carriers 1, 2 and 3 are aggregated for the UE.

When component carriers with different TDD uplink/downlink configurations are aggregated for the UE, in order to enable the different component carriers to normally obtain scheduling information and perform an Acknowledgement/Non-Acknowledgement (ACK/NACK) feedback, it is necessary to define for each carrier a downlink reference TDD uplink/downlink configuration for determining downlink Hybrid Automatic Repeat reQuest (HARQ) timing (simply DL HARQ timing) of the carrier, and an uplink reference TDD uplink/downlink configuration for determining uplink scheduling and HARQ timing (simply UL scheduling/HARQ timing) of the carrier, respectively, where the so-called DL HARQ timing refers to relationship between a downlink sub-frame of a carrier and an uplink sub-frame in which ACK/NACK information of the downlink sub-frame is transmitted, and the so-called UL scheduling/HARQ timing refers to relationship between an uplink sub-frame of a carrier and a downlink sub-frame in which scheduling information of the uplink sub-frame is transmitted, and relationship between an uplink sub-frame of a carrier and a downlink sub-frame in which ACK/NACK information of the uplink sub-frame is transmitted.

As currently specified, both the downlink reference TDD uplink/downlink configuration and the uplink reference TDD uplink/downlink configuration of a Primary Component Carrier (PCC) are the SIB-1 TDD uplink/downlink configuration of the PCC, and the downlink reference TDD uplink/downlink configuration of a Secondary Component Carrier (SCC) is dependent upon particular configurations of the SCC and the PCC, which may be the SIB1 TDD uplink/downlink configuration of the PCC or the SIB1 TDD uplink/downlink configuration of the SCC or may be another TDD uplink/downlink configuration, particularly as specified in the standard; and the uplink reference TDD uplink/downlink configuration of the SCC is the SIB-1 TDD uplink/downlink configuration of the SCC in self-carrier scheduling, and may be the SIB-1 TDD uplink/downlink configuration of the SCC or the SIB-1 TDD uplink/downlink configuration of the scheduling CC in cross-carrier scheduling, particularly as specified in the standard.

In the LTE system, a Physical Downlink Control Channel (PDCCH) is primarily configured to transmit scheduling information and power control commands of uplink and downlink traffic. Different Downlink Control Information (DCI) formats are defined for different applications and different carried information contents of the scheduling information. The DCI formats 1/1A/1B/1C/1D/2/2A/2B/2C can be applicable to a PDCCH carried with downlink scheduling information, the DCI formats 0/4 can be applicable to a PDCCH carried with uplink scheduling information, and the DCI formats 3/3A can be applicable to a PDCCH carried with a group of uplink power control command, where the DCI formats 1C/3/3A can only be transmitted in Common Search Space (CSS), the DCI formats 0/1A can be transmitted in CSS and UE-specific Search Space (USS), and the remaining DCI formats can only be transmitted in USS.

The UE needs to detect a PDCCH over two sets of resources, i.e., in CSS and USS. The CSS only present in a primary cell is shared by all of UEs in the cell and primarily used to transmit scheduling signaling of common information, so the size of DCI (i.e., the number of bits in the DCI) transmitted in the CSS must be uniform for all UEs. The USS present on a scheduling carrier of the UE is used to transmit scheduling signaling of UE-specific data, and sizes of DCI of different UEs may be different. Detection of a PDCCH by a UE is blind detection, that is, the UE attempts to identify a correct PDCCH at different Control Channel Element (CCE) aggregation levels and different sizes of DCI. Generally the different DCI formats differ in size with different particular information carried therein. In order to reduce the number of times that the UE performs blind detection of a PDCCH, bit padding has been introduced to satisfy the following conditions:

a. Any DCI format includes a different number of bits from predefined ambiguous numbers of bits {12, 14, 16, 20, 24, 26, 32, 40, 44, 56} so that the UE will not detect a plurality of PDCCH starting locations;

b. There is a uniform size of the DCI formats 0/1A/3/3A in the same search space, so the UE can detect in the same search space the DCI formats 0/1A/3/3A at only one size of DCI and distinguish between the DCI formats 0/1A, the DCI format 3 and the DCI format 3A by different Cell-Radio Network Temporary Identifiers (C-RNTIs) for scrambling Cyclic Redundancy Check (CRC) of a PDCCH and further distinguish between the DCI format 0 and the DCI format 1A by a 1-bit identifier in the DCI formats 0/1A;

c. When the CRC of a PDCCH is not scrambled by a C-RNTI, the size of the DCI format 1 is the same as the size of the DCI formats 0/1A; and d. When the CRC of a PDCCH is scrambled by a C-RNTI, there are a different size of the DCI formats 1/1B/1D from that of the DCI formats 0/1A and a different size of the DCI format 4 from that of the DCI formats 1/2/2A/2B/2C, for scheduling the same carrier, transmitted in the same USS, so that the UE distinguishes between the different DCI formats by their sizes of DCI;

In the LTE-A Rel-10 system, only one of 2-bit Uplink (UL) index field and 2-bit Downlink Assignment Index (DAI) field is present in the DCI formats 0/4 at a time, and the UL index is only present when the SIB-1 TDD uplink/downlink configuration of the UE is configuration 0, to indicate whether a plurality of UL sub-frames are scheduled concurrently in a DL sub-frame (i.e., uplink multi-subframe scheduling) when there are more TDD UL sub-frames than DL sub-frames, so that each UL sub-frame can be provided with scheduling information; and the DAI is only present when the SIB-1 TDD uplink/downlink configurations of the UE belongs to configuration 1 to 6, so that when ACK/NACK information corresponding to a plurality of downlink sub-frames is to be fed back concurrently in an uplink sub-frame in the TDD system (that is, a value of M of the carrier is larger than 1, where M represents the number of elements, i.e., the number of downlink sub-frames including special sub-frames for which ACK/NACK needs to be fed back, in a set of downlink indexes associated with an uplink sub-frame, determined from the SIB-1 TDD uplink/downlink configuration configured for the UE), the number of ACK/NACK feedback bits corresponding to each carrier is determined from a value indicated in the DAI field to thereby reduce a resource overhead of ACK/NACK over a PUSCH while avoiding inconsistent understanding of an eNB and the UE about the number of ACK/NACK feedback bits transmitted over the PUSCH.

When carriers with different TDD uplink/downlink configurations are aggregated, different reference TDD uplink/downlink configurations may be used for DL HARQ timing and UL scheduling/HARQ timing of different component carriers, and different reference TDD uplink/downlink configurations may also be used for DL HARQ timing and UL scheduling/HARQ timing on the same component carrier.

In the prior art, the method in the Rel-10 of judging from an SIB-1 TDD uplink/downlink configuration of a UE whether a DCI format is to contain the UL index or the DAI can not accommodate the demand above, and may even cause the presence of both the UL index and the DAI in the DCI format, for example, when two carriers configured with the SIB-1 TDD uplink/downlink configurations 0 and 1 are aggregated for the UE, a change in size of a DCI format transmitted in a CSS may impose an influence upon normal transmission of cell common information. Thus the method in the Rel-10 of judging whether a DCI format is to contain the UL index or the DAI will not be applicable to the inter-band carrier aggregation system any more, and there has been absent so far a specific method of judging whether a DCI format is to contain the UL index and/or the DAI for a UE with inter-band carrier aggregation.

SUMMARY OF THE INVENTION

Embodiments of the invention provide a method of and device for transmitting DCI in inter-band carrier aggregation so as to perform uplink multi-subframe scheduling, and perform dynamic adjustment to the number of transmitted bits and a resource overhead of ACK/NACK information over a PUSCH, for a UE for which carriers with different TDD uplink/downlink configurations are aggregated.

Particular technical solutions according to the embodiments of the invention are as follows:

A method of transmitting DCI includes:
judging, by a UE, under a predefined rule or from configuration information signaled in higher-layer signaling whether a DCI format of a PDCCH for scheduling a PUSCH is to contain the UL index and/or the DAI; and
further determining, by the UE, according to a result of the judging, the number of transmitted bits in a DCI format of a PDCCH to be detected in a current downlink sub-frame; and
detecting, by the UE, a PDCCH according to the determined number of transmitted bits in the DCI format, wherein carriers aggregated for the UE include at least two carriers with different TDD uplink/downlink configurations, and the TDD uplink/downlink configurations of the carriers are signaled in system information.

A method of transmitting DCI includes:
judging, by an eNB, under a predefined rule or from configuration information signaled to a UE in higher-layer signaling whether a DCI format of a PDCCH for scheduling a PUSCH is to contain the UL index and/or the DAI; and
further determining, by the eNB, according to a result of the judging, the number of transmitted bits in a DCI format for a PDCCH to be transmitted to the UE and transmitting a PDCCH according to the determined number of transmitted bits in the DCI format, wherein carriers aggregated for the UE include at least two carriers with different TDD uplink/downlink configurations, and the TDD uplink/downlink configurations of the carriers are signaled in system information.

A device for transmitting DCI includes:
a first processing unit configured to judge under a predefined rule or from configuration information signaled in higher-layer signaling whether a DCI format of a PDCCH for scheduling a PUSCH is to contain the UL index and/or the DAI;

a second processing unit configured to further determine according to a result of the judging, the number of transmitted bits in a DCI format for a PDCCH to be detected in a current downlink sub-frame and to detect a PDCCH according to the determined number of transmitted bits in the DCI format, wherein carriers aggregated for the device include at least two carriers with different TDD uplink/downlink configurations, and the TDD uplink/downlink configurations of the carriers are signaled in system information.

A device for transmitting DCI includes:

a first controlling unit configured to judge under a predefined rule or from configuration information signaled to a UE in higher-layer signaling whether a DCI format of a PDCCH for scheduling a PUSCH is to contain the UL index and/or the DAI; and a second controlling unit configured to further determine according to a result of the judging, the number of transmitted bits in a DCI format for a PDCCH to be transmitted to the UE and to transmit a PDCCH at the determined number of transmitted bits in the DCI format, wherein carriers aggregated for the UE include at least two carriers with different TDD uplink/downlink configurations, and the TDD uplink/downlink configurations of the carriers are signaled in system information.

In the embodiments of the invention, for an LTE-A CA UE for which carriers with different TDD uplink/downlink configurations are aggregated, it is judged, separately for a CSS and a USS, according to a predefined rule or configuration information in higher-layer signaling whether a DCI format of a PDCCH for scheduling a PUSCH is to contain the UL index and/or the DAI. In this way, there will be no change in size of DCI transmitted in the CSS so that cell common information can be transmitted normally; and in the meantime, particular bit fields in DCI can be determined reasonably as required in reality in the USS to thereby support UL multi-subframe scheduling and/or control on a resource overhead of ACK/NACK over a PUSCH.

DETAILED DESCRIPTION OF THE EMBODIMENTS

In the LTE-A Rel-11, in order to avoid mutual interference between TDD systems at adjacent frequencies in inter-band CA, there may be different TDD uplink/downlink configurations of component carriers aggregated for a UE. The method in the Rel-10 system of judging from a TDD uplink/downlink configuration signaled in an SIB-1 whether DCI is to contain the DAI or the UL index will not be applicable any more. In view of this, there are proposed in embodiments of the invention a method of determining the size of a DCI format of a PDCCH when carriers with different TDD uplink/downlink configurations are aggregated, and particularly, for an LTE-A CA UE for which carriers with different TDD uplink/downlink configurations are aggregated, it is judged under a predefined rule or from configuration information signaled in higher-layer signaling whether a DCI format of a PDCCH for scheduling a PUSCH is to contain the UL index and/or the DAI, and a PDCCH is received according the determined size of the DCI format.

Preferred embodiments of the invention will be described below in details with reference to the drawings.

Figure 1:
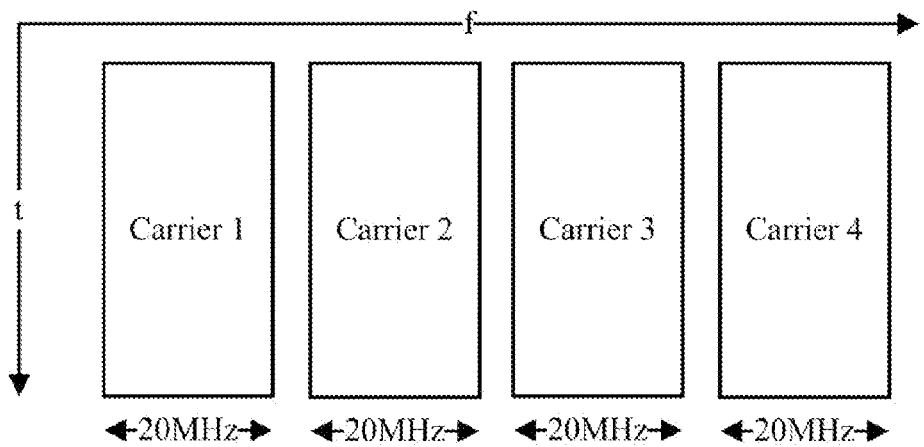
FIG. 1 is a schematic diagram of carrier aggregation in the prior art.
Figure 2:
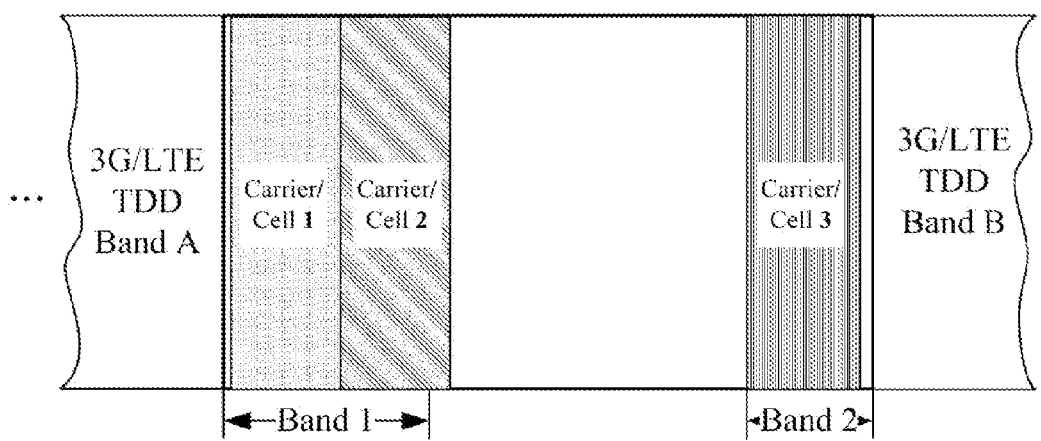
FIG. 2 is a schematic diagram of inter-band carrier aggregation in the prior art.
Figure 3:
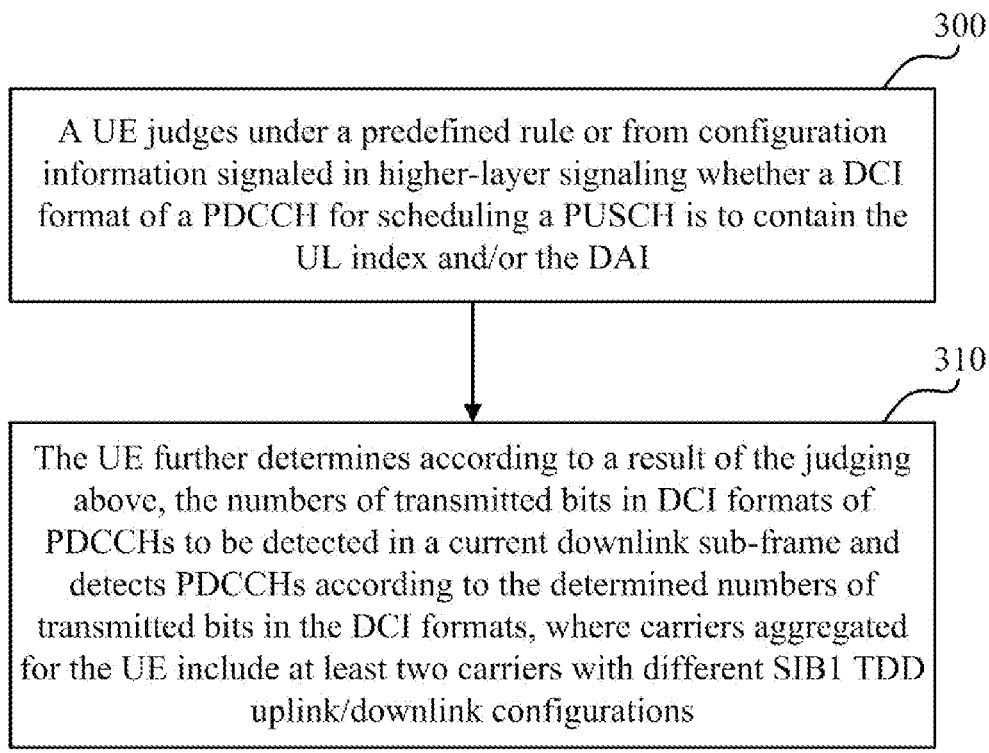
FIG. 3 is a flow chart of a UE determining a DCI format for a PDCCH in inter-band carrier aggregation according to an embodiment of the invention.

Referring to FIG. 3, there is illustrated a detailed flow of a UE determining a DCI format for a PDCCH in inter-band carrier aggregation according to an embodiment of the invention as follows:

In the step 300, a UE judges under a predefined rule or from configuration information signaled in higher-layer signaling whether a DCI format of a PDCCH for scheduling a PUSCH is to contain the UL index and/or the DAI.

In this embodiment, the so-called higher-layer signaling can include but will not be limited to Medium Access Control (MAC) signaling, Radio Resource Control (RRC) signaling, etc.

In the step 310, the UE further determines according to a result of the judging above, the number of transmitted bits in a DCI format of a PDCCH to be detected in a current downlink sub-frame and detects a PDCCH according to the determined number of transmitted bits in the DCI format, where carriers aggregated for the UE include at least two carriers with different TDD uplink/downlink configurations, and the TDD uplink/downlink configurations of the carriers are signaled in system information (e.g., an SIB1); in other words, the carriers aggregated for the UE include at least two carriers with different SIB1 TDD uplink/downlink configurations.

In the embodiment of the invention, a DCI format of a PDCCH to be detected by the UE includes but will not be limited to one or more of the DCI formats 0/1/1A/1B/1C/1D/2/2A/2B/2C/3/3A/4; and several particular ones of the DCI formats to be detected can be determined from particular uplink and downlink transmission modes of the UE and an RNTI configured for use.

On the other hand, the step 310 can be performed particularly as follows: the UE determines, according to judging result of whether the UL index and/or the DAI is to be contained, the number of valid bits in the DCI format of a PDCCH for scheduling a PUSCH (i.e., the sum of numbers of bits in different information fields in each DCI format), pads bits in each DCI format of a PDCCH to be detected by the UE in the current downlink sub-frame under a bit padding rule (see the Background of the Invention for details) based upon the number of valid bits in the DCI format of a PDCCH for scheduling a PUSCH and/or the number of valid bits in each DCI format of a PDCCH to be detected, takes the number of bits in each DCI format after the bits padding as the number of transmitted bits of the corresponding DCI format, and detects PDCCHs according to the determined numbers of transmitted bits of the DCI formats for detection, in a CSS, and in a USS on a carrier for which a PDCCH needs to be detected.

Based upon the embodiment above, an implementation of the step 300 will be described below in details.

In an implementation of the embodiment of the invention, the predefined rule or the configuration information in the higher-layer signaling in the CSS to indicate whether a DCI format of a PDCCH for scheduling a PUSCH is to contain the UL index and/or the DAI is independent of that in the USS; that is, the UE needs to judge for the CSS and the USS respectively under the corresponding predefined rules whether a DCI format of a PDCCH for scheduling a PUSCH is to contain the UL index and/or the DAI, or the UE needs to judge for the CSS and the USS respectively from the configuration information signaled in the higher-layer signaling whether a DCI format of a PDCCH for scheduling a PUSCH is to contain the UL index and/or the DAI. In a real application, of course, the predefined rule or the configuration information in the higher-layer signaling to indicate whether a DCI format of a PDCCH for scheduling a PUSCH is to contain the UL index and/or the DAI can alternatively be shared in the CSS and the USS.

In a first scenario, taking the CSS as an example, the UE can judge in the CSS under the predefined rule whether a DCI format of a PDCCH for scheduling a PUSCH is to contain athe UL index and/or the DAI in any one of the following schemes:

In a scheme 11, the UE always determines that a DCI format of a PDCCH for scheduling a PUSCH is to contain the DAI but no UL index.

For example, a UL grant transmitted in the CSS always supports use of the 2-bit DAI value to control the number of valid ACK/NACK bits of a carrier with M>1 but does not support UL multi-subframe scheduling on a PCC, where M represents the number of associated downlink sub-frames for which ACK/NACK needs to be fed back corresponding a current uplink sub-frame, and for a UE for which carriers with different TDD uplink/downlink configurations are aggregated, a value of M may differ from one carrier to another and can be determined from the downlink reference TDD uplink/downlink configuration of each carrier, and the same will apply throughout the following embodiments, so a repeated description thereof will be omitted.

In a scheme 12, the UE always determines that a DCI format of a PDCCH for scheduling a PUSCH is to contain the UL index but no DAI.

For example, a UL grant transmitted in the CSS always supports UL multi-subframe scheduling on a PCC but does not support use of the 2-bit DAI value to control the number of valid ACK/NACK bits of a carrier with M>1.

In a scheme 13, the UE judges from a UL index condition and/or a DAI condition whether a DCI format of a PDCCH for scheduling a PUSCH is to contain the UL index and/or the DAI.

In this embodiment, the scheme 13 above can be implemented in any one of the following schemes:

In a scheme 13a, when a UL index condition 1 is satisfied (without regard to a DAI condition 1), it is determined that the DCI format of a PDCCH for scheduling a PUSCH is to contain the UL index but no DAI; otherwise, it is determined that the DCI format of a PDCCH for scheduling a PUSCH is to contain the DAI but no UL index.

For example, a UL grant transmitted in the CSS supports UL multi-subframe scheduling on a PCC when the PCC is with the TDD uplink/downlink configuration 0 and supports use of the 2-bit DAI value to control the number of valid ACK/NACK bits of a carrier with M>1 for a PCC when the PCC is with other than the TDD uplink/downlink configuration 0.

In a scheme 13b, when the DAI condition 1 is satisfied (without regard to the UL index condition 1), it is determined that the DCI format of a PDCCH for scheduling a PUSCH is to contain the DAI but no UL index; otherwise, it is determined that the DCI format of a PDCCH for scheduling a PUSCH is to contain the UL index but no DAI.

For example, a UL grant transmitted in the CSS supports use of the 2-bit DAI value to control the number of valid ACK/NACK bits of a carrier with M>1 when there is at least one carrier (or there are all of aggregated carriers) with M>1 and supports UL multi-subframe scheduling on a PCC when there are all (or is at least one) of the carriers with M≤1.

In a scheme 13c, when only the UL index condition 1 but not the DAI condition 1 is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index.

For example, a UL grant transmitted in the CSS supports UL multi-subframe scheduling on a PCC when the PCC is with the TDD uplink/downlink configuration 0 and there are all (or is at least one) of the carriers with M≤1 and supports use of the 2-bit DAI value to control the number of valid ACK/NACK bits of a carrier with M>1 when a PCC is with other than the TDD uplink/downlink configuration 0 or there is at least one (or are all) of the carriers with M>1.

In a scheme 13d, when only the DAI condition 1 but not the UL index condition 1 is satisfied, it is determined that the DCI format of a PDCCH for scheduling a PUSCH is to contain the DAI but no UL index; otherwise, it is determined that the DCI format of a PDCCH for scheduling a PUSCH is to contain the UL index but no DAI.

For example, a UL grant transmitted in the CSS supports use of the 2-bit DAI value to control the number of valid ACK/NACK bits of a carrier with M>1 when there is at least one (or are all) of the carriers with M>1 and a PCC is with other than the TDD uplink/downlink configuration 0 and supports UL multi-subframe scheduling on a PCC when the PCC is with the TDD uplink/downlink configuration 0 or there are all (or is at least one) of the carriers with M≤1.

In the schemes 13a to 13d above:

The DAI condition 1 is that when the downlink reference TDD uplink/downlink configuration of at least one (or all) of the aggregated carriers of the UE is of a first category of TDD uplink/downlink configurations, the DCI format of a PDCCH for scheduling a PUSCH is to contain the DAI; or the DAI condition 1 is that when the downlink reference TDD uplink/downlink configuration of a primary carrier of the UE is of the first category of TDD uplink/downlink configurations, the DCI format of a PDCCH for scheduling a PUSCH is to contain the DAI; or the DAI condition 1 is that when the SIB1 TDD uplink/downlink configuration of the PCC of the UE is of the first category of TDD uplink/downlink configurations, the DCI format of a PDCCH for scheduling a PUSCH is to contain the DAI;

The UL index condition 1 is when the uplink reference TDD uplink/downlink configuration of the primary carrier of a UE is of a second category of TDD uplink/downlink configurations, the DCI format of a PDCCH for scheduling a PUSCH is to contain the UL index; or the UL index condition 1 is that when the SIB1 TDD uplink/downlink configuration of the PCC of the UE is of the second category of TDD uplink/downlink configurations, the DCI format of a PDCCH for scheduling a PUSCH is to contain the UL index; and The so-called downlink reference TDD uplink/downlink configuration refers to a TDD uplink/downlink configuration to determine the relationship between a downlink sub-frame and an uplink sub-frame in which ACK/NACK information of the downlink sub-frame is transmitted, and for the PCC, the downlink reference TDD uplink/downlink configuration thereof is the SIB1 TDD uplink/downlink configuration of the PCC; and the so-called uplink reference TDD uplink/downlink configuration refers to a TDD uplink/downlink configuration to determine the relationship between an uplink sub-frame and a downlink sub-frame in which scheduling information of the uplink sub-frame is transmitted and the relationship between an uplink sub-frame and a downlink sub-frame in which ACK/NACK information of the uplink sub-frame is transmitted, and for the PCC, the uplink reference TDD uplink/downlink configuration thereof is the SIB-1 TDD uplink/downlink configuration of the PCC. The concepts above have been described in details in the Background of the Invention and will apply throughout the following embodiments, so a repeated description thereof will be omitted.

The so-called first category of TDD uplink/downlink configurations refers to configurations in which the number of DL sub-frames is no less than the number of UL sub-frames in a radio frame, e.g., the TDD uplink/downlink configurations 1 to 6; and the so-called second category of TDD uplink/downlink configurations refers to configurations in which the number of DL sub-frames is less than the number of UL sub-frames in a radio frame, i.e., configurations other than the first category of TDD uplink/downlink configurations, e.g., the TDD uplink/downlink configuration 0; and Furthermore the PDCCH above to schedule a PUSCH includes a PDCCH carried with a UL grant and a PDCCH indicating Semi-Persistent Scheduling (SPS) activation of a PUSCH, and the DCI format includes but will not be limited to the DCI formats 0 and 4.

Preferably when the uplink reference TDD uplink/downlink configuration or the SIB-1 TDD uplink/downlink configuration of the PCC is of the second category of TDD uplink/downlink configurations but the DCI format determined above is to contain no UL index and/or when the downlink reference TDD uplink/downlink configuration of at least one of the aggregated carriers is of the first category of TDD uplink/downlink configurations but the DCI format determined above is to contain no DAI, an eNB shall avoid a PDCCH with the DCI format above from being transmitted in the CSS and the UE will not expect to receive a PDCCH with the DCI format above in the CSS.

In a second scenario, taking the USS as an example, when the UE judges in the USS under the predefined rule whether the DCI format of a PDCCH for scheduling a PUSCH is to contain the UL index and/or the DAI, it can be judged uniformly for all the aggregated carriers of the UE whether the DCI format of a PDCCH for scheduling a PUSCH is to contain the UL index and/or the DAI, that is, a uniform DCI format is to be used in PDCCHs for scheduling PUSCHs on the respective aggregated carriers of the UE, or it can be judged separately for each of the aggregated carriers of the UE whether the DCI format of a PDCCH for scheduling a PUSCH is to contain the UL index and/or the DAI, that is, different DCI formats respectively is to be used in PDCCHs for scheduling PUSCHs on the respective aggregated carriers of the UE.

These two situations will be described below respectively.

On one hand, it can be judged uniformly for all the aggregated carriers of the UE whether the DCI format of a PDCCH for scheduling a PUSCH is to contain the UL index and/or the DAI in any one of the following schemes:

In a scheme 21, the UE always determines that the DCI format of a PDCCH for scheduling a PUSCH is to contain the DAI but no UL index.

For example, a UL grant transmitted in the USS always supports use of the 2-bit DAI value to control the number of valid ACK/NACK bits of a carrier with M>1 but does not support UL multi-subframe scheduling on a carrier with the SIB-1 TDD uplink/downlink configuration or the uplink reference TDD uplink/downlink configuration being the TDD uplink/downlink configuration 0.

In a scheme 22, the UE always determines that the DCI format of a PDCCH for scheduling a PUSCH is to contain the UL index but no DAI.

For example, a UL grant transmitted in the USS always supports UL multi-subframe scheduling on a carrier with the SIB-1 TDD uplink/downlink configuration or the uplink reference TDD uplink/downlink configuration being the TDD uplink/downlink configuration 0 but does not support use of the 2-bit DAI value to control the number of valid ACK/NACK bits of a carrier with M>1.

In a scheme 23, the UE always determines that the DCI format of a PDCCH for scheduling a PUSCH is to contain both the UL index and DAI.

For example, a UL grant transmitted in the USS always supports both UL multi-subframe scheduling on a carrier with the SIB-1 TDD uplink/downlink configuration or the uplink reference TDD uplink/downlink configuration being the TDD uplink/downlink configuration 0 and supports use of the 2-bit DAI value to control the number of valid ACK/NACK bits of a carrier with M>1 at the cost of a larger number of transmitted bits of DCI.

In a scheme 24, the UE determines, from a UL index condition and/or a DAI condition, particular information fields in the DCI format of a PDCCH for scheduling a PUSCH.

In this embodiment, the scheme 24 above can be implemented particularly in any one of the following schemes:

In a scheme 24a, when a UL index condition 2 is satisfied (without regard to a DAI condition 2), it is determined that the DCI format of a PDCCH for scheduling a PUSCH is to contain the UL index but no DAI; otherwise, it is determined that the DCI format of a PDCCH for scheduling a PUSCH is to contain the DAI but no UL index.

In a scheme 24b, when the DAI condition 2 is satisfied (without regard to the UL index condition 2), it is determined that the DCI format of a PDCCH for scheduling a PUSCH is to contain the DAI but no UL index; otherwise, it is determined that the DCI format of a PDCCH for scheduling a PUSCH is to contain the UL index but no DAI.

In a scheme 24c, when only the UL index condition 2 but not the DAI condition 2 is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index.

In a scheme 24d, when only the DAI condition 2 but not the UL index condition 2 is satisfied, it is determined that the DCI format of a PDCCH for scheduling a PUSCH is to contain the DAI but no UL index; otherwise, it is determined that the DCI format of a PDCCH for scheduling a PUSCH is to contain the UL index but no DAI.

In a scheme 24e, when both the UL index condition 2 and the DAI condition 2 are satisfied, it is determined that the DCI format of a PDCCH for scheduling a PUSCH is to contain both the UL index and the DAI; when only the UL index condition 2 but not the DAI condition 2 is satisfied, it is determined that the DCI format of a PDCCH for scheduling a PUSCH is to contain the UL index but no DAI; when only the DAI condition 2 but not the UL index condition 2 is satisfied, it is determined that the DCI format of a PDCCH for scheduling a PUSCH is to contain the DAI but no UL index; and when neither the UL index condition 2 nor the DAI condition 2 is satisfied, it is determined in a predefined scheme that the DCI format of a PDCCH for scheduling a PUSCH is to contain only one of DAI and UL index bit fields, for example, to contain the DAI but no UL index or to contain the UL index but no DAI.

In the schemes 24a to 24e above:

The DAI condition 2 is that when the downlink reference TDD uplink/downlink configuration of at least one (or all) of the aggregated carriers of the UE is of a first category of TDD uplink/downlink configurations, the DCI format of a PDCCH for scheduling a PUSCH is to contain the DAI; or the DAI condition 2 is that when the SIB1 TDD uplink/downlink configuration of at least one (or all) of the aggregated carriers of the UE is of the first category of TDD uplink/downlink configurations, the DCI format of a PDCCH for scheduling a PUSCH is to contain the DAI;

The UL index condition 2 is that when the uplink reference TDD uplink/downlink configuration of the at least one (or all) of the aggregated carriers of the UE is of a second category of TDD uplink/downlink configurations, the DCI format of a PDCCH for scheduling a PUSCH is to contain the UL index; or the UL index condition 2 is that when the SIB1 TDD uplink/downlink configuration of the at least one (or all) of the aggregated carriers of the UE is of the second category of TDD uplink/downlink configurations, the DCI format of a PDCCH for scheduling a PUSCH is to contain the UL index;

The so-called first category of TDD uplink/downlink configurations refers to configurations in which the number of DL sub-frames is no less than the number of UL sub-frames in a radio frame, e.g., the TDD uplink/downlink configurations 1 to 6; and the so-called second category of TDD uplink/downlink configurations refers to configurations in which the number of DL sub-frames is less than the number of UL sub-frames in a radio frame, i.e., configurations other than the first category of TDD uplink/downlink configurations, e.g., the TDD uplink/downlink configuration 0; and Furthermore the PDCCH above to schedule a PUSCH includes a PDCCH carried with a UL grant and a PDCCH indicating Semi-Persistent Scheduling (SPS) activation of a PUSCH, and the DCI format includes but will not be limited to the DCI formats 0 and 4.

Particularly in the schemes 24a to 24e above, when neither the UL index condition 2 nor the DAI condition 2 is satisfied, it can alternatively be predefined that the DCI format of a PDCCH for scheduling a PUSCH is to contain neither the DAI nor the UL index; and On the other hand, the UE can judge separately for each of the aggregated carriers of the UE whether the DCI format of a PDCCH for scheduling a PUSCH is to contain the UL index and/or the DAI in a scheme 31, and taking any one configured/activated carrier as an example, the scheme 31 can be implemented particularly in any one of the following schemes:

In a scheme 31a, when a UL index condition 3 is satisfied by the any one carrier (without regard to a DAI condition 3), it is determined that the DCI format of a PDCCH for scheduling a PUSCH on the any one carrier is to contain the UL index but no DAI; otherwise, it is determined that the DCI format of a PDCCH for scheduling a PUSCH on the any one carrier is to contain the DAI but no UL index.

In a scheme 31b, when the DAI condition 3 is satisfied by the any one carrier (without regard to the UL index condition 3), it is determined that the DCI format of a PDCCH for scheduling a PUSCH on the any one carrier is to contain the DAI but no UL index; otherwise, it is determined that the DCI format of a PDCCH for scheduling a PUSCH on the any one carrier is to contain the UL index but no DAI.

In a scheme 31c, when only the UL index condition 3 but not the DAI condition 3 is satisfied by the any one carrier, it is determined that the DCI format of a PDCCH for scheduling a PUSCH on the any one carrier is to contain the UL index but no DAI; otherwise, it is determined that the DCI format of a PDCCH for scheduling a PUSCH on the any one carrier is to contain the DAI but no UL index.

In a scheme 31d, when only the DAI condition 3 but not the UL index condition 3 is satisfied by the any one carrier, it is determined that the DCI format of a PDCCH for scheduling a PUSCH on the any one carrier is to contain the DAI but no UL index; otherwise, it is determined that the DCI format of a PDCCH for scheduling a PUSCH on the any one carrier is to contain the UL index but no DAI.

In a scheme 31e, when both the UL index condition 3 and the DAI condition 3 are satisfied by the any one carrier, it is determined that the DCI format of a PDCCH for scheduling a PUSCH on the any one carrier is to contain both the UL index and the DAI; when only the UL index condition 3 but not the DAI condition 3 is satisfied by the any one carrier, it is determined that the DCI format of a PDCCH for scheduling a PUSCH on the any one carrier is to contain the UL index but no DAI; when only the DAI condition 3 but not the UL index condition 3 is satisfied by the any one carrier, it is determined that the DCI format of a PDCCH for scheduling a PUSCH on the any one carrier is to contain the DAI but no UL index; and when neither the UL index condition 3 nor the DAI condition 3 is satisfied by the any one carrier, it is determined in a predefined scheme that the DCI format of a PDCCH for scheduling a PUSCH on the any one carrier is to contain only one of DAI and UL index bit fields, for example, to contain the DAI but no UL index or to contain the UL index but no DAI.

In the schemes 31a to 31e above:

The DAI condition 3 is that when the downlink reference TDD uplink/downlink configuration of the any one carrier is of a first category of TDD uplink/downlink configurations, the DCI format of a PDCCH for scheduling a PUSCH on the any one carrier is to contain the DAI; or the DAI condition 3 is that when the SIB1 TDD uplink/downlink configuration of the any one carrier is of the first category of TDD uplink/downlink configurations, the DCI format of a PDCCH for scheduling a PUSCH on the any one carrier is to contain the DAI;

The UL index condition 3 is that when the uplink reference TDD uplink/downlink configuration of the any one carrier is of a second category of TDD uplink/downlink configurations, the DCI format of a PDCCH for scheduling a PUSCH on the any one carrier is to contain the UL index; or the UL index condition 3 is that when the SIB1 TDD uplink/downlink configuration of the any one carrier is of the second category of TDD uplink/downlink configurations, the DCI format of a PDCCH for scheduling a PUSCH on the any one carrier is to contain the UL index;

The so-called first category of TDD uplink/downlink configurations refers to configurations in which the number of DL sub-frames is no less than the number of UL sub-frames in a radio frame, e.g., the TDD uplink/downlink configurations 1 to 6; and the so-called second category of TDD uplink/downlink configurations refers to configurations in which the number of DL sub-frames is less than the number of UL sub-frames in a radio frame, i.e., configurations other than the first category of TDD uplink/downlink configurations, e.g., the TDD uplink/downlink configuration 0; and Furthermore the PDCCH above to schedule a PUSCH includes a PDCCH carried with a UL grant and a PDCCH indicating Semi-Persistent Scheduling (SPS) activation of a PUSCH, and the DCI format includes but will not be limited to the DCI formats 0 and 4.

Particularly in the schemes 31a to 31e above, when neither the UL index condition 3 nor the DAI condition 3 is satisfied by the any one carrier, it can alternatively be predefined that the DCI format of a PDCCH for scheduling a PUSCH on the any one carrier is to contain neither the DAI nor the UL index.

In the schemes 31a to 31e above, if self-carrier scheduling is performed on a current carrier, then a PDCCH to schedule a PUSCH on the carrier is transmitted in a USS corresponding to the carrier on the carrier; and if cross-carrier scheduling is performed on the current carrier, then a PDCCH to schedule a PUSCH on the current carrier is transmitted in the USS corresponding to the current carrier on a scheduling carrier (a carrier on which scheduling signaling of the current carrier is transmitted).

Preferably since only self-carrier scheduling is supported on the PCC and when there is a PUSCH transmitted on the PCC, the UE transmits ACK/NACK over the PUSCH, in order to ensure that UL multi-subframe scheduling on the PCC and control on valid ACK/NACK bits in the PUSCH transmitted on the PCC can be supported when the SIB-1 configuration of the PCC is the TDD uplink/downlink configuration 0, it can always be predefined or configured in higher-layer signaling that the DCI format of a PDCCH for scheduling a PUSCH is to contain both the UL index and the DAI in a UE-specific search space of the PCC, or use of the scheme 31e can always be predefined in a UE-specific search space of the PCC.

When the schemes in the CSS and the USS to judge whether the DCI format of a PDCCH for scheduling a PUSCH on a PCC is to contain the UL index and the DAI are common one of the various schemes defined above of the CSS and the USS, in another implementation of the embodiment of the invention, the predefined rule or the configuration information in the higher-layer signaling to indicate whether the DCI format of a PDCCH for scheduling a PUSCH is to contain the UL index and/or the DAI is shared in the CSS and the USS, that is, the same scheme is applied in the CSS and the USS to judge whether the DCI format of a PDCCH for scheduling a PUSCH is to contain the UL index and the DAI, particularly as follows:

On one hand, in order to judge uniformly for all the aggregated carriers of the UE whether the DCI format of a PDCCH for scheduling a PUSCH is to contain the UL index and/or the DAI, it can be judged whether the DCI format of a PDCCH, in a CSS of the PCC and a USS of each carrier, for scheduling a PUSCH is to contain the UL index and/or the DAI particularly in any one of the following schemes:

In a scheme 41, the UE always determines that the DCI format of a PDCCH for scheduling a PUSCH is to contain the DAI but no UL index.

In a scheme 42, the UE always determines that the DCI format of a PDCCH for scheduling a PUSCH is to contain the UL index but no DAI.

In a scheme 43, the UE judges from a UL index condition and/or a DAI condition whether the DCI format of a PDCCH for scheduling a PUSCH is to contain the UL index and/or the DAI.

The scheme 43 above can be implemented particularly in any one of the following schemes:

In a scheme 43a, when a UL index condition 4 is satisfied (that is, at this time a DAI condition 4 is not satisfied), it is determined that the DCI format of a PDCCH for scheduling a PUSCH is to contain the UL index but no DAI; otherwise, it is determined that the DCI format of a PDCCH for scheduling a PUSCH is to contain the DAI but no UL index.

In a scheme 43b, when the DAI condition 4 is satisfied (that is, at this time the UL index condition 4 is not satisfied), it is determined that the DCI format of a PDCCH for scheduling a PUSCH is to contain the DAI but no UL index; otherwise, it is determined that the DCI format of a PDCCH for scheduling a PUSCH is to contain the UL index but no DAI.

In the schemes 43a and 43b above:

The DAI condition 4 is that when the downlink reference TDD uplink/downlink configuration of at least one (or all) of the aggregated carriers of the UE is of a first category of TDD uplink/downlink configurations, the DCI format of a PDCCH for scheduling a PUSCH is to contain the DAI; and The UL index condition 4 is that when the uplink reference TDD uplink/downlink configuration of the at least one (or all) of the aggregated carriers of the UE is of a second category of TDD uplink/downlink configurations, the DCI format of a PDCCH for scheduling a PUSCH is to contain the UL index.

On the other hand, in order to judge separately for each of the aggregated carriers of the UE whether the DCI format of a PDCCH for scheduling a PUSCH is to contain the UL index and/or the DAI, it can be judged in a scheme 51 whether the DCI format of each PDCCH, transmitted in a CSS of the PCC and a USS of each carrier, for scheduling a PUSCH is to contain the UL index and/or the DAI, and for each carrier, the scheme 51 can be embodied particularly as any one of the following schemes:

In a scheme 51a, when a UL index condition 5 is satisfied by the carrier (without regard to a DAI condition 5), it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index.

In a scheme 51b, when the DAI condition 5 is satisfied by the carrier (without regard to the UL index condition 5), it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI.

In a scheme 51c, when only the UL index condition 5 but not the DAI condition 5 is satisfied by the carrier, it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index.

In a scheme 51d, when only the DAI condition 5 but not the UL index condition 5 is satisfied by the carrier, it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI.

In the schemes 51a to 51d above:

The DAI condition 5 is that when the downlink reference TDD uplink/downlink configuration of the carrier is of a first category of TDD uplink/downlink configurations, the DCI format of a PDCCH for scheduling a PUSCH on the carrier is to contain the DAI; or the DAI condition 5 is that when the SIB1 TDD uplink/downlink configuration of the carrier is of the first category of TDD uplink/downlink configurations, the DCI format of a PDCCH for scheduling a PUSCH on the carrier is to contain the DAI; and The UL index condition 5 is that when the uplink reference TDD uplink/downlink configuration of the carrier is of a second category of TDD uplink/downlink configurations, the DCI format of a PDCCH for scheduling a PUSCH on the carrier is to contain the UL index; or the UL index condition 5 is that when the SIB1 TDD uplink/downlink configuration of the carrier is of the second category of TDD uplink/downlink configurations, the DCI format of a PDCCH for scheduling a PUSCH on the carrier is to contain the UL index;

In the embodiment above, the so-called first category of TDD uplink/downlink configurations refers to configurations in which the number of DL sub-frames is no less than the number of uplink sub-frames in a radio frame, e.g., the TDD uplink/downlink configurations 1 to 6; and the so-called second category of TDD uplink/downlink configurations refers to configurations in which the number of DL sub-frames is less than the number of uplink sub-frames in a radio frame, i.e., configurations other than the first category of TDD uplink/downlink configurations, e.g., the TDD uplink/downlink configuration 0; and Furthermore the PDCCH above to schedule a PUSCH includes a PDCCH carried with a UL grant and a PDCCH indicating Semi-Persistent Scheduling (SPS) activation of a PUSCH, and the DCI format includes but will not be limited to the DCI formats 0 and 4.

Figure 4:
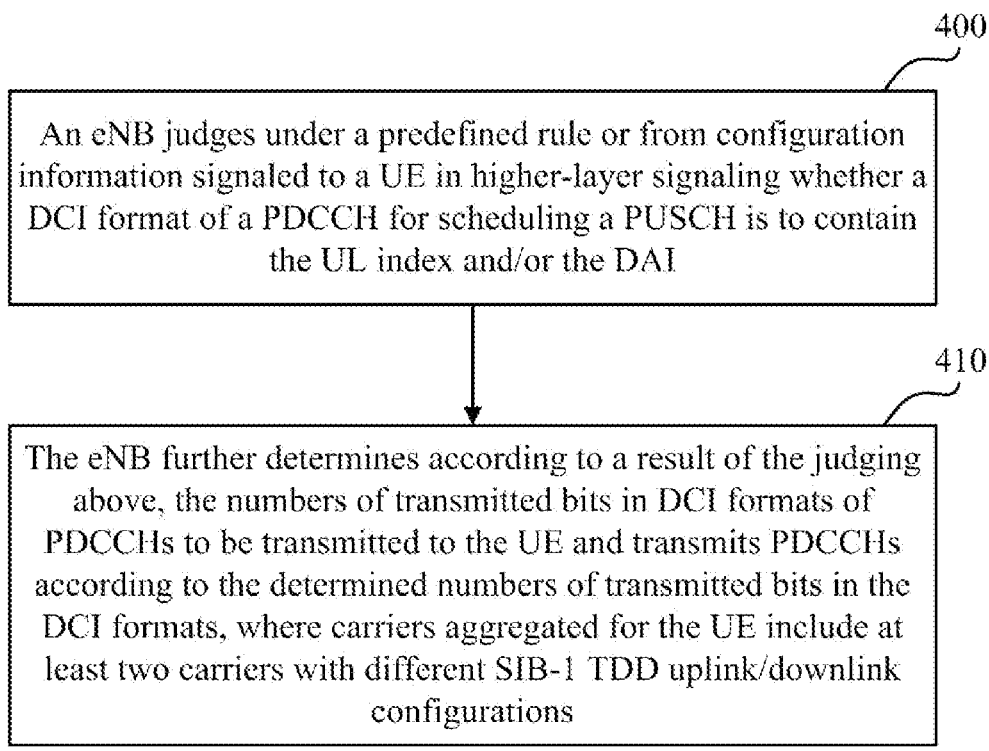
FIG. 4 is a flow chart of an eNB determining a DCI format for a PDCCH in inter-band carrier aggregation according to an embodiment of the invention.

Based upon the embodiment above, referring to FIG. 4, there is illustrated a detailed flow of an eNB determining a DCI format for a PDCCH in inter-band carrier aggregation according to an embodiment of the invention, corresponding to the UE side, as follows:

In the step 400, an eNB judges under a predefined rule or from configuration information signaled to a UE in higher-layer signaling whether a DCI format of a PDCCH for scheduling a PUSCH is to contain the UL index and/or the DAI.

In this embodiment, the so-called higher-layer signaling can include but will not be limited to MAC signaling, RRC signaling, etc.

On the other hand, the step 400 can also be performed in a number of implementations, for example, the predefined rule or the configuration information in the higher-layer signaling in the CSS to indicate whether the DCI format of a PDCCH for scheduling a PUSCH is to contain the UL index and/or the DAI is independent of that in the USS; that is, the eNB needs to judge for the CSS and the USS respectively under the corresponding predefined rules whether the DCI format of a PDCCH for scheduling a PUSCH is to contain the UL index and/or the DAI, or the eNB needs to judge for the CSS and the USS respectively whether the DCI format of a PDCCH for scheduling a PUSCH is to contain the UL index and/or the DAI and further transmit the configuration information to the UE in the higher-layer signaling to notify the UE of a result of the judging. In a real application, of course, the predefined rule or the configuration information in the higher-layer signaling to indicate whether the DCI format of a PDCCH for scheduling a PUSCH is to contain the UL index and/or the DAI can alternatively be shared in the CSS and the USS.

A particular scheme for the eNB to judge under the predefined rule whether the DCI format of a PDCCH for scheduling a PUSCH is to contain the UL index and/or the DAI corresponds to that at the UE side, and reference can be made to the relevant description of the UE side for details thereof, so a repeated description thereof will be omitted here.

In the step 410, the eNB further determines according to a result of the judging above, the number of transmitted bits in a DCI format of a PDCCH to be transmitted to the UE and transmits a PDCCH according to the determined number of transmitted bits in the DCI format, where carriers aggregated for the UE include at least two carriers with different SIB-1 TDD uplink/downlink configurations.

The step 410 can be performed particularly as follows: the eNB determines, according to judging result of whether the UL index and/or the DAI is to be contained, the number of valid bits in the DCI format of a PDCCH for scheduling a PUSCH (i.e., the sum of numbers of bits in different information fields in each DCI format), pads bits in the DCI format of a PDCCH to be transmitted to the UE in the current downlink sub-frame under a bit padding rule (see the Background of the Invention for details) based upon the number of valid bits in the DCI format of a PDCCH for scheduling a PUSCH and/or the number of valid bits in each of the DCI formats of PDCCHs to be transmitted to the UE, takes the number of bits in each DCI format after the bits padding as the number of transmitted bits in the corresponding DCI format, and transmits PDCCHs according to the determined numbers of transmitted bits in the DCI formats for detection, in a CSS, and in a USS on a carrier for which a PDCCH needs to be transmitted.

It shall be noted that the methods described in the embodiments above can be equally applicable to a scenario where a TDD carrier and an FDD carrier are aggregated and a scenario where a TDD carrier is a PCC and DL HARQ timing and/or UL HARQ/scheduling timing of an FDD carrier corresponds to a TDD uplink/downlink configuration, a detailed description of which will be omitted here.

Figure 5A:
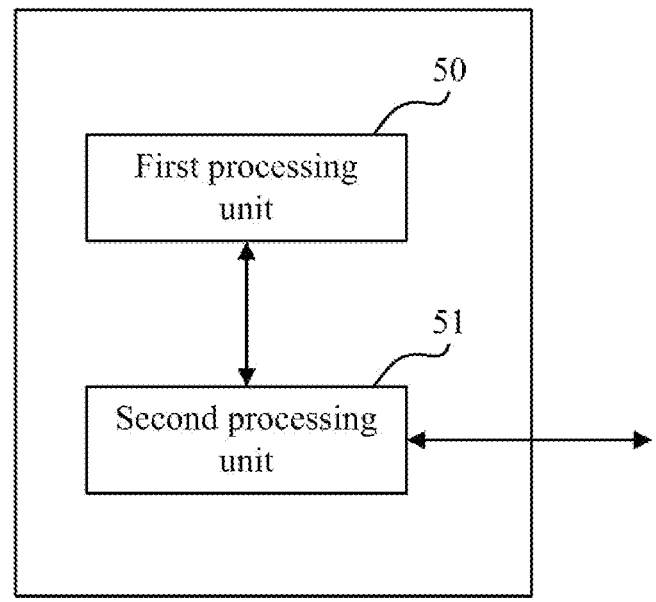
FIG. 5A is a schematic functionally structural diagram of a UE according to an embodiment of the invention.

Based upon the embodiments above, referring to FIG. 5 and FIG. 6, in an embodiment of the invention, As illustrated in FIG. 5A, a UE includes a first processing unit 50 and a second processing unit 51, where:

The first processing unit 50 is configured to judge under a predefined rule or from configuration information signaled in higher-layer signaling whether a DCI format of a PDCCH for scheduling a PUSCH is to contain the UL index and/or the DAI; and The second processing unit 51 is configured to further determine according to a result of the judging above, the number of transmitted bits in a DCI format of a PDCCH to be detected in a current downlink sub-frame and to detect a PDCCH according to the determined number of transmitted bits in the DCI format, where carriers aggregated for the UE include at least two carriers with different TDD uplink/downlink configurations, and the TDD uplink/downlink configurations of the carriers are signaled in system information.

Furthermore the first processing unit 50 judges for a common search space and a User Equipment (UE)-specific search space respectively under the corresponding predefined rules whether the DCI format of a PDCCH for scheduling a PUSCH is to contain the UL index and/or the DAI, or the first processing unit judges for the common search space and the UE-specific search space respectively from the corresponding configuration information signaled in the higher-layer signaling whether the DCI format of a PDCCH for scheduling a PUSCH is to contain the UL index and/or the DAI.

Furthermore the first processing unit 50 judges in the common search space under the predefined rule whether the DCI format of a PDCCH for scheduling a PUSCH is to contain the UL index and/or the DAI in any one of the following schemes:

The first processing unit 50 always determines that the DCI format of a PDCCH for scheduling a PUSCH is to contain the DAI but no UL index; or The first processing unit 50 always determines that the DCI format of a PDCCH for scheduling a PUSCH is to contain the UL index but no DAI; or The first processing unit 50 judges from a UL index condition and/or a DAI condition whether the DCI format of a PDCCH for scheduling a PUSCH is to contain the UL index and/or the DAI.

Furthermore the first processing unit 50 judges from the UL index condition and/or the DAI condition whether the DCI format of a PDCCH for scheduling a PUSCH is to contain the UL index and/or the DAI in any one of the following schemes:

If a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; and The first DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the first DAI condition is that when a downlink reference TDD uplink/downlink configuration of a primary carrier is of the first category of TDD uplink/downlink configurations, the DCI format of a PDCCH for scheduling a PUSCH is to contain the DAI; or the first DAI condition is that when a TDD uplink/downlink configuration of the primary carrier signaled in the system information is of the first category of TDD uplink/downlink configurations, the DCI format of a PDCCH for scheduling a PUSCH is to contain the DAI;

The first UL index condition is that when an uplink reference TDD uplink/downlink configuration of the primary carrier is of a second category of TDD uplink/downlink configurations, the DCI format of a PDCCH for scheduling a PUSCH is to contain the UL index; or the first UL index condition is that when the TDD uplink/downlink configuration of the primary carrier signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

Furthermore the first processing unit 50 judges in the UE-specific search space under the predefined rule whether the DCI format of a PDCCH for scheduling a PUSCH is to contain the UL index and/or the DAI, at least by:

judging uniformly for all the aggregated carriers whether the DCI format of a PDCCH for scheduling a PUSCH is to contain the UL index and/or the DAI; or judging separately for each of the aggregated carriers whether the DCI format of a PDCCH for scheduling a PUSCH is to contain the UL index and/or the DAI.

Furthermore it is judged uniformly for all the aggregated carriers whether the DCI format of a PDCCH for scheduling a PUSCH is to contain the UL index and/or the DAI in any one of the following schemes:

The first processing unit 50 always determines that the DCI format of a PDCCH for scheduling a PUSCH is to contain the DAI but no UL index; or The first processing unit 50 always determines that the DCI format of a PDCCH for scheduling a PUSCH is to contain the UL index but no DAI; or The first processing unit 50 always determines that the DCI format of a PDCCH for scheduling a PUSCH is to contain both the UL index and the DAI; or The first processing unit 50 judges from the UL index condition and/or the DAI condition whether the DCI format of a PDCCH for scheduling a PUSCH is to contain the UL index and/or the DAI.

Furthermore the first processing unit 50 judges from the UL index condition and/or the DAI condition whether the DCI format of a PDCCH for scheduling a PUSCH is to contain the UL index and/or the DAI in any one of the following schemes:

If a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; and The second DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the second DAI condition is that when a TDD uplink/downlink configuration of at least one of the aggregated carriers signaled in the system information is of the first category of TDD uplink/downlink configurations, the DCI format of a PDCCH for scheduling a PUSCH is to contain the DAI;

The second UL index condition is that when an uplink reference TDD uplink/downlink configuration of the at least one of the aggregated carriers is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

Furthermore it is judged separately for each of the aggregated carriers whether the DCI format of a PDCCH for scheduling a PUSCH is to contain the UL index and/or the DAI in any one of the following schemes:

If a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields.

The third DAI condition is that when a downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when a TDD uplink/downlink configuration of the carrier signaled in the system information is of the first category of TDD uplink/downlink configurations, the DCI format of a PDCCH for scheduling a PUSCH on the carrier is to contain the DAI;

The third UL index condition is that when an uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and The first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

Furthermore when the second UL index condition and the second DAI condition are referred to, if neither the second UL index condition nor the second DAI condition is satisfied, the first processing unit 50 further determines that the DCI format of a PDCCH for scheduling a PUSCH on the carrier is to contain neither DAI nor UL index; and When the third UL index condition and the third DAI condition are referred to, if neither the third UL index condition nor the third DAI condition is satisfied by the carrier, the first processing unit 50 further determines that the DCI format of a PDCCH for scheduling a PUSCH on the carrier is to contain neither DAI nor UL index.

Furthermore the second processing unit 51 determines according to the result of the judging, the number of transmitted bits in a DCI format for a PDCCH to be detected in the current downlink sub-frame and detects a PDCCH at the determined number of transmitted bits in the DCI format as follows:

The second processing unit 51 determines, according to judging result of whether the DCI format of a PDCCH for scheduling a PUSCH is to contain the UL index and/or the DAI, the number of valid bits in the DCI format of a PDCCH for scheduling a PUSCH;

The second processing unit 51 pads bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be detected, and takes the number of bits in each DCI format after the bits padding as the number of transmitted bits in the corresponding DCI format; and The second processing unit 51 detects PDCCHs according to the determined numbers of transmitted bits in the DCI formats for detection, in a common search space, and in a UE-specific search space on a carrier for which a PDCCH needs to be detected.

Figure 5B:
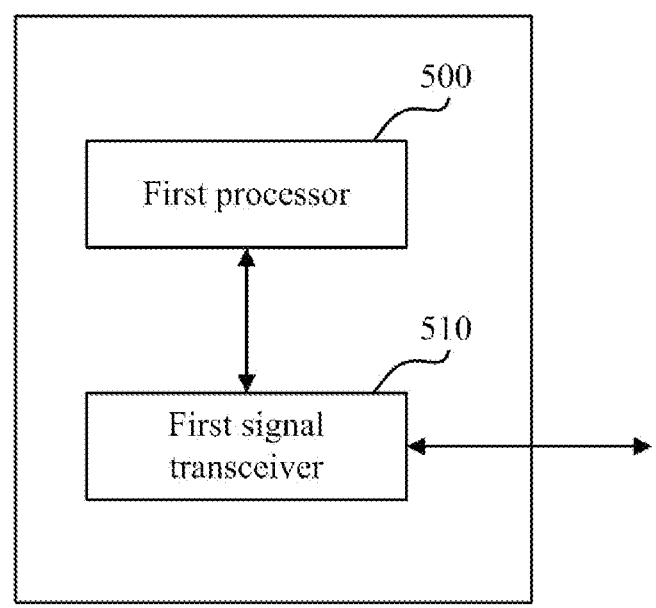
FIG. 5B is a schematic physically structural diagram of a UE according to an embodiment of the invention.

The first processing unit 50 can particularly be a processor, and the second processing unit 51 can particularly be a signal transceiver including transmit and receive antennas, and at this time, as illustrated in FIG. 5B, a UE according to an embodiment of the invention includes:

A first processor 500 is configured to judge under a predefined rule or from configuration information signaled in higher-layer signaling whether a DCI format of a PDCCH for scheduling a PUSCH is to contain the UL index and/or the DAI and to further determine according to a result of the judging above, the number of transmitted bits in a DCI format of a PDCCH to be detected in a current downlink sub-frame; and A first signal transceiver 510 is configured to detect a PDCCH according to the determined number of transmitted bits in the DCI format, where carriers aggregated for the UE include at least two carriers with different TDD uplink/downlink configurations, and the TDD uplink/downlink configurations of the carriers are signaled in system information.

Furthermore the first processor 500 judges for a common search space and a User Equipment (UE)-specific search space respectively under the corresponding predefined rules whether the DCI format of a PDCCH for scheduling a PUSCH is to contain the UL index and/or the DAI, or the first processing unit 500 judges for the common search space and the UE-specific search space respectively from the corresponding configuration information signaled in the higher-layer signaling whether the DCI format of a PDCCH for scheduling a PUSCH is to contain the UL index and/or the DAI.

Furthermore the first processor 500 judges in the common search space under the predefined rule whether the DCI format of a PDCCH for scheduling a PUSCH is to contain the UL index and/or the DAI in any one of the following schemes:

The first processor 500 always determines that the DCI format of a PDCCH for scheduling a PUSCH is to contain the DAI but no UL index; or The first processor 500 always determines that the DCI format of a PDCCH for scheduling a PUSCH is to contain the UL index but no DAI; or The first processor 500 judges from a UL index condition and/or a DAI condition whether the DCI format of a PDCCH for scheduling a PUSCH is to contain the UL index and/or the DAI.

Furthermore the first processor 500 judges from the UL index condition and/or the DAI condition whether the DCI format of a PDCCH for scheduling a PUSCH is to contain the UL index and/or the DAI in any one of the following schemes:

If a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; and The first DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the first DAI condition is that when a downlink reference TDD uplink/downlink configuration of a primary carrier is of the first category of TDD uplink/downlink configurations, the DCI format of a PDCCH for scheduling a PUSCH is to contain the DAI; or the first DAI condition is that when a TDD uplink/downlink configuration of the primary carrier signaled in the system information is of the first category of TDD uplink/downlink configurations, the DCI format of a PDCCH for scheduling a PUSCH is to contain the DAI;

The first UL index condition is that when an uplink reference TDD uplink/downlink configuration of the primary carrier is of a second category of TDD uplink/downlink configurations, the DCI format of a PDCCH for scheduling a PUSCH is to contain the UL index; or the first UL index condition is that when the TDD uplink/downlink configuration of the primary carrier signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

Furthermore the first processor 500 judges in the UE-specific search space under the predefined rule whether the DCI format of a PDCCH for scheduling a PUSCH is to contain the UL index and/or the DAI, at least by:

judging uniformly for all the aggregated carriers whether the DCI format of a PDCCH for scheduling a PUSCH is to contain the UL index and/or the DAI; or judging separately for each of the aggregated carriers whether the DCI format of a PDCCH for scheduling a PUSCH is to contain the UL index and/or the DAI.

Furthermore it is judged uniformly for all the aggregated carriers whether the DCI format of a PDCCH for scheduling a PUSCH is to contain the UL index and/or the DAI in any one of the following schemes:

The first processor 500 always determines that the DCI format of a PDCCH for scheduling a PUSCH is to contain the DAI but no UL index; or The first processor 500 always determines that the DCI format of a PDCCH for scheduling a PUSCH is to contain the UL index but no DAI; or The first processor 500 always determines that the DCI format of a PDCCH for scheduling a PUSCH is to contain both the UL index and the DAI; or The first processor 500 judges from the UL index condition and/or the DAI condition whether the DCI format of a PDCCH for scheduling a PUSCH is to contain the UL index and/or the DAI.

Furthermore the first processor 500 judges from the UL index condition and/or the DAI condition whether the DCI format of a PDCCH for scheduling a PUSCH is to contain the UL index and/or the DAI in any one of the following schemes:

If a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; and The second DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the second DAI condition is that when a TDD uplink/downlink configuration of at least one of the aggregated carriers signaled in the system information is of the first category of TDD uplink/downlink configurations, the DCI format of a PDCCH for scheduling a PUSCH is to contain the DAI;

The second UL index condition is that when an uplink reference TDD uplink/downlink configuration of the at least one of the aggregated carriers is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

Furthermore it is judged separately for each of the aggregated carriers whether the DCI format of a PDCCH for scheduling a PUSCH is to contain the UL index and/or the DAI in any one of the following schemes:

If a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields; and The third DAI condition is that when a downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when a TDD uplink/downlink configuration of the carrier signaled in the system information is of the first category of TDD uplink/downlink configurations, the DCI format of a PDCCH for scheduling a PUSCH on the carrier is to contain the DAI;

The third UL index condition is that when an uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and The first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

Furthermore when the second UL index condition and the second DAI condition are referred to, if neither the second UL index condition nor the second DAI condition is satisfied, the first processor 500 further determines that the DCI format of a PDCCH for scheduling a PUSCH is to contain neither DAI nor UL index; and When the third UL index condition and the third DAI condition are referred to, if neither the third UL index condition nor the third DAI condition is satisfied by the carrier, the first processor 500 further determines that the DCI format of a PDCCH for scheduling a PUSCH on the carrier is to contain neither DAI nor UL index.

Furthermore the first signal transceiver 510 determines according to the result of the judging, the number of transmitted bits in a DCI format of a PDCCH to be detected in the current downlink sub-frame and detects a PDCCH according to the determined number of transmitted bits in the DCI format as follows:

The first processor 500 determines, according to judging result of whether the DCI format of a PDCCH for scheduling a PUSCH is to contain the UL index and/or the DAI, the number of valid bits in the DCI format of a PDCCH for scheduling a PUSCH;

The first processor 500 pads bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be detected, and takes the number of bits in each DCI format after the bits padding as the number of transmitted bits in the corresponding DCI format; and The first signal transceiver 510 detects PDCCHs according to the determined numbers of transmitted bits in the DCI formats for detection, in a common search space, and in a UE-specific search space on a carrier for which a PDCCH needs to be detected.

Figure 6A:
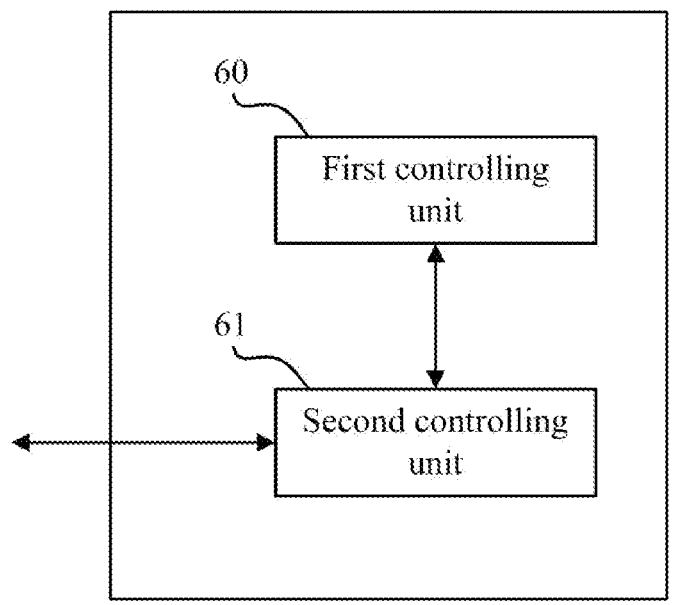
FIG. 6A is a schematic functionally structural diagram of an eNB according to an embodiment of the invention.

As illustrated in FIG. 6A, an eNB includes a first controlling unit 60 and a second controlling unit 61, where:

The first controlling unit 60 is configured to judge under a predefined rule or from configuration information signaled to a UE in higher-layer signaling whether a DCI format of a PDCCH for scheduling a PUSCH is to contain the UL index and/or the DAI; and The second controlling unit 61 is configured to determine according to a result of the judging above, the number of transmitted bits in a DCI format of a PDCCH to be transmitted to the UE and to transmit a PDCCH according to the determined number of transmitted bits in the DCI format, where carriers aggregated for the UE include at least two carriers with different TDD uplink/downlink configurations, and the TDD uplink/downlink configurations of the carriers are signaled in system information.

Furthermore the first controlling unit 60 judges for a common search space and a UE-specific search space respectively under the corresponding predefined rules whether the DCI format of a PDCCH for scheduling a PUSCH is to contain the UL index and/or the DAI, or the first controlling unit 60 judges for the common search space and the UE-specific search space respectively from the corresponding configuration information signaled in the higher-layer signaling whether the DCI format of a PDCCH for scheduling a PUSCH is to contain the UL index and/or the DAI.

Furthermore the first controlling unit 60 judges in the common search space under the predefined rule whether the DCI format of a PDCCH for scheduling a PUSCH is to contain the UL index and/or the DAI in any one of the following schemes:

The first controlling unit 60 always determines that the DCI format of a PDCCH for scheduling a PUSCH is to contain the DAI but no UL index; or The first controlling unit 60 always determines that the DCI format of a PDCCH for scheduling a PUSCH is to contain the UL index but no DAI; or The first controlling unit 60 judges from the UL index condition and/or the DAI condition whether the DCI format of a PDCCH for scheduling a PUSCH is to contain the UL index and/or the DAI.

Furthermore the first controlling unit 60 judges from the UL index condition and/or the DAI condition whether the DCI format of a PDCCH for scheduling a PUSCH is to contain the UL index and/or the DAI in any one of the following schemes:

If a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; and The first DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the first DAI condition is that when a downlink reference TDD uplink/downlink configuration of a primary carrier of the UE is of the first category of TDD uplink/downlink configurations, the DCI format of a PDCCH for scheduling a PUSCH is to contain the DAI; or the first DAI condition is that when a TDD uplink/downlink configuration of the primary carrier of the UE signaled in the system information is of the first category of TDD uplink/downlink configurations, the DCI format of a PDCCH for scheduling a PUSCH is to contain the DAI;

The first UL index condition is that when an uplink reference TDD uplink/downlink configuration of the primary carrier of the UE is of a second category of TDD uplink/downlink configurations, the DCI format of a PDCCH for scheduling a PUSCH is to contain the UL index; or the first UL index condition is that when the TDD uplink/downlink configuration of the primary carrier of the UE signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

Furthermore the first controlling unit 60 judges in the UE-specific search space under the predefined rule whether the DCI format of a PDCCH for scheduling a PUSCH is to contain the UL index and/or the DAI, at least by:

judging uniformly for all the aggregated carriers of the UE whether the DCI format of a PDCCH for scheduling a PUSCH is to contain the UL index and/or the DAI; or judging separately for each of the aggregated carriers of the UE whether the DCI format of a PDCCH for scheduling a PUSCH is to contain the UL index and/or the DAI.

Furthermore it is judged uniformly for all the aggregated carriers of the UE whether the DCI format of a PDCCH for scheduling a PUSCH is to contain the UL index and/or the DAI in any one of the following schemes:

The first controlling unit 60 always determines that the DCI format of a PDCCH for scheduling a PUSCH is to contain the DAI but no UL index; or The first controlling unit 60 always determines that the DCI format of a PDCCH for scheduling a PUSCH is to contain the UL index but no DAI; or The first controlling unit 60 always determines that the DCI format of a PDCCH for scheduling a PUSCH is to contain both the UL index and the DAI; or The first controlling unit 60 judges from a UL index condition and/or a DAI condition whether the DCI format of a PDCCH for scheduling a PUSCH is to contain the UL index and/or the DAI.

Furthermore the first controlling unit 60 judges from the UL index condition and/or the DAI condition whether the DCI format of a PDCCH for scheduling a PUSCH is to contain the UL index and/or the DAI in any one of the following schemes:

If a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; and The second DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the second DAI condition is that when a TDD uplink/downlink configuration of at least one of the aggregated carriers of the UE signaled in the system information is of the first category of TDD uplink/downlink configurations, the DCI format of a PDCCH for scheduling a PUSCH is to contain the DAI;

The second UL index condition is that when an uplink reference TDD uplink/downlink configuration of the at least one of the aggregated carriers of the UE is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers of the UE signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

Furthermore it is judged separately for each of the aggregated carriers of the UE whether the DCI format of a PDCCH for scheduling a PUSCH is to contain the UL index and/or the DAI in any one of the following schemes:

If a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields; and The third DAI condition is that when a downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when a TDD uplink/downlink configuration of the carrier signaled in the system information is of the first category of TDD uplink/downlink configurations, the DCI format of a PDCCH for scheduling a PUSCH on the carrier is to contain the DAI;

The third UL index condition is that when an uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and The first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

Furthermore when the second UL index condition and the second DAI condition are referred to, if neither the second UL index condition nor the second DAI condition is satisfied, the first controlling unit 60 further determines that the DCI format of a PDCCH for scheduling a PUSCH is to contain neither DAI nor UL index; and When the third UL index condition and the third DAI condition are referred to, if neither the third UL index condition nor the third DAI condition is satisfied by the carrier, the first controlling unit 60 further determines that the DCI format of a PDCCH for scheduling a PUSCH on the carrier is to contain neither DAI nor UL index.

Furthermore the second controlling unit 61 determines according to the result of the judging, the number of transmitted bits in a DCI format of a PDCCH to be transmitted to the UE and transmits a PDCCH according to the determined number of transmitted bits in the DCI format as follows:

The second controlling unit 61 determines, according to judging result of whether the DCI format of a PDCCH for scheduling a PUSCH is to contain the UL index and/or the DAI, the number of valid bits in the DCI format of a PDCCH for scheduling a PUSCH;

The second controlling unit 61 pads bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be transmitted to the UE, and takes the number of bits in each DCI format after the bits padding as the number of transmitted bits in the corresponding DCI format; and The second controlling unit 61 transmits PDCCHs according to the determined numbers of transmitted bits in the DCI formats for detection, in a common search space, and in a UE-specific search space on a carrier for which a PDCCH needs to be detected.

Figure 6B:
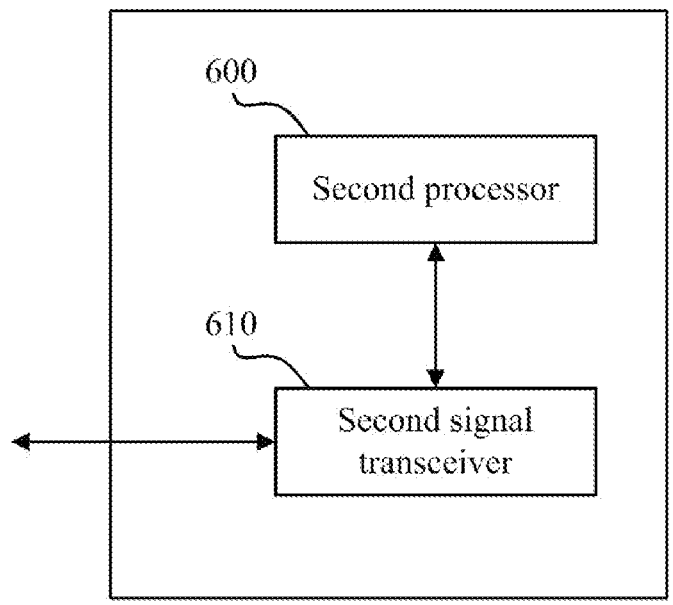
FIG. 6B is a schematic physically structural diagram of an eNB according to an embodiment of the invention.

The first controlling unit 60 can particularly be a processor, and the second controlling unit 61 can particularly be a signal transceiver including transmit and receive antennas, and at this time, as illustrated in FIG. 6B, an eNB according to an embodiment of the invention includes:

A second controller 600 is configured to judge under a predefined rule or from configuration information signaled to a UE in higher-layer signaling whether a DCI format of a PDCCH for scheduling a PUSCH is to contain the UL index and/or the DAI and to determine according to a result of the judging above, the number of transmitted bits in a DCI format of a PDCCH to be transmitted to the UE; and A second signal transceiver 610 is configured to transmit a PDCCH according to the determined number of transmitted bits in the DCI format, where carriers aggregated for the UE include at least two carriers with different TDD uplink/downlink configurations, and the TDD uplink/downlink configurations of the carriers are signaled in system information.

Furthermore the second controller 600 judges for a common search space and a UE-specific search space respectively under the corresponding predefined rules whether the DCI format of a PDCCH for scheduling a PUSCH is to contain the UL index and/or the DAI, or the second controller 600 judges for the common search space and the UE-specific search space respectively from the corresponding configuration information signaled in the higher-layer signaling whether the DCI format of a PDCCH for scheduling a PUSCH is to contain the UL index and/or the DAI.

Furthermore the second controller 600 judges in the common search space under the predefined rule whether the DCI format of a PDCCH for scheduling a PUSCH is to contain the UL index and/or the DAI in any one of the following schemes:

The second controller 600 always determines that the DCI format of a PDCCH for scheduling a PUSCH is to contain the DAI but no UL index; or The second controller 600 always determines that the DCI format of a PDCCH for scheduling a PUSCH is to contain the UL index but no DAI; or The second controller 600 judges from a UL index condition and/or a DAI condition whether the DCI format of a PDCCH for scheduling a PUSCH is to contain the UL index and/or the DAI.

Furthermore the second controller 600 judges from the UL index condition and/or the DAI condition whether the DCI format of a PDCCH for scheduling a PUSCH is to contain the UL index and/or the DAI in any one of the following schemes:

If a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; and The first DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the first DAI condition is that when a downlink reference TDD uplink/downlink configuration of a primary carrier of the UE is of the first category of TDD uplink/downlink configurations, the DCI format of a PDCCH for scheduling a PUSCH is to contain the DAI; or the first DAI condition is that when a TDD uplink/downlink configuration of the primary carrier of the UE signaled in the system information is of the first category of TDD uplink/downlink configurations, the DCI format of a PDCCH for scheduling a PUSCH is to contain the DAI;

The first UL index condition is that when an uplink reference TDD uplink/downlink configuration of the primary carrier of the UE is of a second category of TDD uplink/downlink configurations, the DCI format of a PDCCH for scheduling a PUSCH is to contain the UL index; or the first UL index condition is that when the TDD uplink/downlink configuration of the primary carrier of the UE signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

Furthermore the second controller 600 judges in the UE-specific search space under the predefined rule whether the DCI format of a PDCCH for scheduling a PUSCH is to contain the UL index and/or the DAI, at least by:

judging uniformly for all the aggregated carriers of the UE whether the DCI format of a PDCCH for scheduling a PUSCH is to contain the UL index and/or the DAI; or judging separately for each of the aggregated carriers of the UE whether the DCI format of a PDCCH for scheduling a PUSCH is to contain the UL index and/or the DAI.

Furthermore it is judged uniformly for all the aggregated carriers of the UE whether the DCI format of a PDCCH for scheduling a PUSCH is to contain the UL index and/or the DAI in any one of the following schemes:

The second controller 600 always determines that the DCI format of a PDCCH for scheduling a PUSCH is to contain the DAI but no UL index; or The second controller 600 always determines that the DCI format of a PDCCH for scheduling a PUSCH is to contain the UL index but no DAI; or The second controller 600 always determines that the DCI format of a PDCCH for scheduling a PUSCH is to contain both the UL index and the DAI; or The second controller 600 judges from a UL index condition and/or a DAI condition whether the DCI format of a PDCCH for scheduling a PUSCH is to contain the UL index and/or the DAI.

Furthermore the second controller 600 judges from the UL index condition and/or the DAI condition whether the DCI format of a PDCCH for scheduling a PUSCH is to contain the UL index and/or the DAI in any one of the following schemes:

If a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or If only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or If both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; and The second DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the second DAI condition is that when a TDD uplink/downlink configuration of at least one of the aggregated carriers of the UE signaled in the system information is of the first category of TDD uplink/downlink configurations, the DCI format of a PDCCH for scheduling a PUSCH is to contain the DAI;

The second UL index condition is that when an uplink reference TDD uplink/downlink configuration of the at least one of the aggregated carriers of the UE is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers of the UE signaled in the system information is of the second category of TDD uplink/downlink configurations, the DCI format of a PDCCH for scheduling a PUSCH is to contain the UL index; and The first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

Furthermore it is judged separately for each of the aggregated carriers of the UE whether the DCI format of a PDCCH for scheduling a PUSCH is to contain the UL index and/or the DAI in any one of the following schemes:

If a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or If only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or If both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields; and The third DAI condition is that when a downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when a TDD uplink/downlink configuration of the carrier signaled in the system information is of the first category of TDD uplink/downlink configurations, the DCI format of a PDCCH for scheduling a PUSCH on the carrier is to contain the DAI;

The third UL index condition is that when an uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and The first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

Furthermore when the second UL index condition and the second DAI condition are referred to, if neither the second UL index condition nor the second DAI condition is satisfied, the second controller 600 further determines that the DCI format of a PDCCH for scheduling a PUSCH is to contain neither DAI nor UL index; and When the third UL index condition and the third DAI condition are referred to, if neither the third UL index condition nor the third DAI condition is satisfied by the carrier, the second controller 600 further determines that the DCI format of a PDCCH for scheduling a PUSCH on the carrier is to contain neither DAI nor UL index.

Furthermore the second signal transceiver 610 determines, according to judging result of whether the DCI format of a PDCCH for scheduling a PUSCH is to contain the DAI and/or the UL index, the number of valid bits in the DCI format of a PDCCH for scheduling a PUSCH;

The second signal transceiver 610 pads bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be transmitted to the UE, and takes the number of bits in each DCI format after the bits padding as the number of transmitted bits in the corresponding DCI format; and The second signal transceiver 610 transmits PDCCHs according to the determined numbers of transmitted bits in the DCI formats for detection, in a common search space, and in a UE-specific search space on a carrier for which a PDCCH needs to be detected.

In the embodiments of the invention, for an LTE-A CA UE for which carriers with different TDD uplink/downlink configurations are aggregated, it is judged, separately for a CSS and a USS, according to a predefined rule or configuration information in higher-layer signaling whether a DCI format of a PDCCH for scheduling a PUSCH is to contain the UL index and/or the DAI. In this way, there will be no change in size of DCI transmitted in the CSS so that cell common information can be transmitted normally; and in the meantime, particular bit fields in DCI can be determined reasonably as required in reality in the USS to thereby support UL multi-subframe scheduling and/or control on a resource overhead of ACK/NACK over a PUSCH.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of transmitting Downlink Control Information (DCI), wherein the method comprises:
   judging, by a User Equipment (UE), under a predefined rule or from configuration information signaled in higher-layer signaling whether a DCI format of a Physical Downlink Control Channel (PDCCH) for scheduling a Physical Uplink Shared Channel (PUSCH) is to contain an Uplink (UL) index and/or a Downlink Assignment Index (DAI); and
   further determining, by the UE, according to a result of the judging, the number of transmitted bits in a DCI format of a PDCCH to be detected in a current downlink subframe, and detecting the PDCCH according to the determined number of transmitted bits in the DCI format, wherein carriers aggregated for the UE comprise at least two carriers with different Time Division Duplex (TDD) uplink/downlink configurations, and the TDD uplink/downlink configurations of the carriers are signaled in system information.

2. The method according to claim 1, wherein the UE judges in a common search space under the predefined rule whether the DCI format of a PDCCH for scheduling a PUSCH is to contain the UL index and/or the DAI in any one of the following schemes:
   the UE always determines that the DCI format of a PDCCH for scheduling a PUSCH is to contain the DAI but no UL index; or the UE always determines that the DCI format of a PDCCH for scheduling a PUSCH is to contain the UL index but no DAI; or the UE judges from a UL index condition and/or a DAI condition whether the DCI format of a PDCCH for scheduling a PUSCH is to contain the UL index and/or the DAI;
   and/or
   judging, by the UE, in a UE-specific search space under the predefined rule whether the DCI format of a PDCCH for scheduling a PUSCH is to contain the UL index and/or the DAI, comprises:
   judging uniformly for all the aggregated carriers of the UE whether the DCI format of a PDCCH for scheduling a PUSCH is to contain the UL index and/or the DAI; or judging separately for each of the aggregated carriers of the UE whether the DCI format of a PDCCH for scheduling a PUSCH is to contain the UL index and/or the DAI.

3. The method according to claim 2, wherein the UE judges from the UL index condition and/or the DAI condition whether the DCI format of a PDCCH for scheduling a PUSCH is to contain the UL index and/or the DAI in any one of the following schemes:
   if a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
   if a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or
   if only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
   if only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI;
   wherein the first DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the first DAI condition is that when the downlink reference TDD uplink/downlink configuration of a primary carrier of the UE is of the first category of TDD uplink/downlink configurations, the DCI format of a PDCCH for scheduling a PUSCH is to contain the DAI; or the first DAI condition is that when the TDD uplink/downlink configuration of the primary carrier of the UE signaled in the system information is of the first category of TDD uplink/downlink configurations, the DCI format of a PDCCH for scheduling a PUSCH is to contain the DAI;
   the first UL index condition is that when an uplink reference TDD uplink/downlink configuration of the primary carrier of the UE is of a second category of TDD uplink/downlink configurations, the DCI format of a PDCCH for scheduling a PUSCH is to contain the UL index; or the first UL index condition is that when the TDD uplink/downlink configuration of the primary carrier of the UE signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

4. The method according to claim 2, wherein it is judged uniformly for all the aggregated carriers of the UE whether the DCI format of a PDCCH for scheduling a PUSCH is to contain the UL index and/or the DAI in any one of the following schemes:

in a scheme 1, the UE always determines that the DCI format of a PDCCH for scheduling a PUSCH is to contain the DAI but no UL index; or in a scheme 2, the UE always determines that the DCI format of a PDCCH for scheduling a PUSCH is to contain the UL index but no DAI; or in a scheme 3, the UE always determines that the DCI format of a PDCCH for scheduling a PUSCH is to contain both the UL index and the DAI; or in a scheme 4, the UE judges from a UL index condition and/or a DAI condition whether the DCI format of a PDCCH for scheduling a PUSCH is to contain the UL index and/or the DAI; and in the scheme 4:

if a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or if a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or if only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or if only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or if both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of the DAI and the UL index bit fields; or if neither the second UL index condition nor the second DAI condition is satisfied, then it is determined in a predefined scheme that the DCI format of a PDCCH for scheduling a PUSCH is to contain neither DAI nor UL index;

wherein the second DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the second DAI condition is that when the TDD uplink/downlink configuration of at least one of the aggregated carriers of the UE signaled in the system information is of the first category of TDD uplink/downlink configurations, the DCI format of a PDCCH for scheduling a PUSCH is to contain the DAI;

the second UL index condition is that when an uplink reference TDD uplink/downlink configuration of the at least one of the aggregated carriers of the UE is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers of the UE signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

5. The method according to claim 1, wherein further determining, by the UE, according to the result of the judging, the number of transmitted bits in a DCI format of a PDCCH to be detected in the current downlink sub-frame, and detecting the PDCCH according to the determined number of transmitted bits in the DCI format comprises:

determining, by the UE, according to judging result of whether the DCI format of a PDCCH for scheduling a PUSCH is to contain the UL index and/or the DAI, the number of valid bits in the DCI format of a PDCCH for scheduling a PUSCH;

padding, by the UE, bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be detected, and taking the number of bits in each DCI format after the bits padding as the number of transmitted bits in the corresponding DCI format; and detecting, by the UE, PDCCHs according to the determined numbers of transmitted bits in the DCI formats for detection, in a common search space, and in a UE-specific search space on a carrier for which a PDCCH needs to be detected.

6. A method of transmitting Downlink Control Information (DCI), wherein the method comprises:

judging, by an evolved Node B (eNB), under a predefined rule or from configuration information signaled to a User Equipment (UE) in higher-layer signaling whether a DCI format of a Physical Downlink Control Channel (PDCCH) for scheduling a Physical Uplink Shared Channel (PUSCH) is to contain an Uplink (UL) index and/or a Downlink Assignment Index (DAI); and further determining, by the eNB, according to a result of the judging, the number of transmitted bits in a DCI format of a PDCCH to be transmitted to the UE, and transmitting a PDCCH according to the determined number of transmitted bits in the DCI format, wherein carriers aggregated for the UE comprise at least two carriers with different TDD uplink/downlink configurations, and the TDD uplink/downlink configurations of the carriers are signaled in system information.

7. The method according to claim 6, wherein the eNB judges in a common search space under the predefined rule whether the DCI format of a PDCCH for scheduling a PUSCH is to contain the UL index and/or the DAI in any one of the following schemes:
the eNB always determines that the DCI format of a PDCCH for scheduling a PUSCH is to contain the DAI but no UL index; or the eNB always determines that the DCI format of a PDCCH for scheduling a PUSCH is to contain the UL index but no DAI; or the eNB judges from a UL index condition and/or a DAI condition whether the DCI format of a PDCCH for scheduling a PUSCH is to contain the UL index and/or the DAI; and/or
judging, by the eNB, in a UE-specific search space under the predefined rule whether the DCI format of a PDCCH for scheduling a PUSCH is to contain the UL index and/or the DAI, comprises:
judging uniformly for all the aggregated carriers of the UE whether the DCI format of a PDCCH for scheduling a PUSCH is to contain the UL index and/or the DAI; or
judging separately for each of the aggregated carriers of the UE whether the DCI format of a PDCCH for scheduling a PUSCH is to contain the UL index and/or the DAI.

8. The method according to claim 7, wherein the eNB judges from the UL index condition and/or the DAI condition whether the DCI format of a PDCCH for scheduling a PUSCH is to contain the UL index and/or the DAI in any one of the following schemes:
if a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
if a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or
if only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
if only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI;

wherein the first DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the first DAI condition is that when the downlink reference TDD uplink/downlink configuration of a primary carrier of the UE is of the first category of TDD uplink/downlink configurations, the DCI format of a PDCCH for scheduling a PUSCH is to contain the DAI; or the first DAI condition is that when the TDD uplink/downlink configuration of the primary carrier of the UE signaled in the system information is of the first category of TDD uplink/downlink configurations, the DCI format of a PDCCH for scheduling a PUSCH is to contain the DAI;

the first UL index condition is that when an uplink reference TDD uplink/downlink configuration of the primary carrier of the UE is of a second category of TDD uplink/downlink configurations, the DCI format of a PDCCH for scheduling a PUSCH is to contain the UL index; or the first UL index condition is that when the TDD uplink/downlink configuration of the primary carrier of the UE signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

9. The method according to claim 7, wherein it is judged uniformly for all the aggregated carriers of the UE whether the DCI format of a PDCCH for scheduling a PUSCH is to contain the UL index and/or the DAI in any one of the following schemes:
in a scheme 1, the eNB always determines that the DCI format of a PDCCH for scheduling a PUSCH is to contain the DAI but no UL index; or
in a scheme 2, the eNB always determines that the DCI format of a PDCCH for scheduling a PUSCH is to contain the UL index but no DAI; or
in a scheme 3, the eNB always determines that the DCI format of a PDCCH for scheduling a PUSCH is to contain both the UL index and the DAI; or
in a scheme 4, the eNB judges from a UL index condition and/or a DAI condition whether the DCI format of a PDCCH for scheduling a PUSCH is to contain the UL index and/or the DAI; and
in the scheme 4:
if a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
if a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or if only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or if only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or if both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; or if neither the second UL index condition nor the second DAI condition is satisfied, then it is determined in a predefined scheme that the DCI format of a PDCCH for scheduling a PUSCH is to contain neither DAI nor UL index;

wherein the second DAI condition is that when a downlink reference TDD uplink/downlink configuration of at least one of the aggregated carriers of the UE is of a first category of TDD uplink/downlink configurations, the DCI format of a PDCCH for scheduling a PUSCH is to contain the DAI; or the second DAI condition is that when the TDD uplink/downlink configuration of at least one of the aggregated carriers of the UE signaled in the system information is of the first category of TDD uplink/downlink configurations, the DCI format of a PDCCH for scheduling a PUSCH is to contain the DAI;

the second UL index condition is that when an uplink reference TDD uplink/downlink configuration of the at least one of the aggregated carriers of the UE is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers of the UE signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

10. The method according to claim 6, wherein further determining, by the eNB, according to the result of the judging, the number of transmitted bits in a DCI format of a PDCCH to be transmitted to the UE, and transmitting the PDCCH according to the determined number of transmitted bits in the DCI format comprises:

determining, by the eNB, according to judging result of whether the DCI format of a PDCCH for scheduling a PUSCH is to contain the UL index and/or the DAI, the number of valid bits in the DCI format of a PDCCH for scheduling a PUSCH;

padding, by the eNB, bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be transmitted to the UE, and taking the number of bits in each DCI format after the bits padding as the number of transmitted bits in the corresponding DCI format; and transmitting, by the eNB, PDCCHs according to the determined numbers of transmitted bits in the DCI formats for detection, in a common search space, and in a UE-specific search space on a carrier for which a PDCCH needs to be detected.

11. A device for transmitting Downlink Control Information (DCI), wherein the device comprises:

a first processing unit configured to judge under a predefined rule or from configuration information signaled in higher-layer signaling whether a DCI format of a Physical Downlink Control Channel (PDCCH) for scheduling a Physical Uplink Shared Channel (PUSCH) is to contain an Uplink (UL) index and/or a Downlink Assignment Index (DAI);

a second processing unit configured to further determine according to a result of the judging, the number of transmitted bits in a DCI format of a PDCCH to be detected in a current downlink sub-frame and to detect the PDCCH according to the determined number of transmitted bits in the DCI format, wherein carriers aggregated for the device comprise at least two carriers with different Time Division Duplex (TDD) uplink/downlink configurations, and the TDD uplink/downlink configurations of the carriers are signaled in system information.

12. The device according to claim 11, wherein the first processing unit judges in a common search space under the predefined rule whether the DCI format of a PDCCH for scheduling a PUSCH is to contain the UL index and/or the DAI in any one of the following schemes:

the first processing unit always determines that the DCI format of a PDCCH for scheduling a PUSCH is to contain the DAI but no UL index; or the first processing unit always determines that the DCI format of a PDCCH for scheduling a PUSCH is to contain the UL index but no DAI; or the first processing unit judges from a UL index condition and/or a DAI condition whether the DCI format of a PDCCH for scheduling a PUSCH is to contain the UL index and/or the DAI;

and/or the first processing unit judges in a UE-specific search space under the predefined rule whether the DCI format of a PDCCH for scheduling a PUSCH is to contain the UL index and/or the DAI, at least by:

judging uniformly for all the aggregated carriers whether the DCI format of a PDCCH for scheduling a PUSCH is to contain the UL index and/or the DAI; or judging separately for each of the aggregated carriers whether the DCI format of a PDCCH for scheduling a PUSCH is to contain the UL index and/or the DAI.

13. The device according to claim 12, wherein the first processing unit judges from the UL index condition and/or the DAI condition whether the DCI format of a PDCCH for scheduling a PUSCH is to contain the UL index and/or the DAI in any one of the following schemes:
- if a first UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
- if a first DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or
- if only the first UL index condition but not the first DAI condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
- if only the first DAI condition but not the first UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI;

wherein the first DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the first DAI condition is that when the downlink reference TDD uplink/downlink configuration of a primary carrier is of the first category of TDD uplink/downlink configurations, the DCI format of a PDCCH for scheduling a PUSCH is to contain the DAI; or the first DAI condition is that when the TDD uplink/downlink configuration of the primary carrier signaled in the system information is of the first category of TDD uplink/downlink configurations, the DCI format of a PDCCH for scheduling a PUSCH is to contain the DAI;

the first UL index condition is that when an uplink reference TDD uplink/downlink configuration of the primary carrier is of a second category of TDD uplink/downlink configurations, the DCI format of a PDCCH for scheduling a PUSCH is to contain the UL index; or the first UL index condition is that when the TDD uplink/downlink configuration of the primary carrier signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames in a radio frame, and the second category of TDD uplink/downlink configurations refers to TDD uplink/downlink configurations in which the number of downlink sub-frames is less than the number of uplink sub-frames in a radio frame.

14. The device according to claim 12, wherein the first processing unit judges uniformly for all the aggregated carriers whether the DCI format of a PDCCH for scheduling a PUSCH is to contain the UL index and/or the DAI in any one of the following schemes:
- in a scheme 1, the first processing unit always determines that the DCI format of a PDCCH for scheduling a PUSCH is to contain the DAI but no UL index; or
- in a scheme 2, the first processing unit always determines that the DCI format of a PDCCH for scheduling a PUSCH is to contain the UL index but no DAI; or
- in a scheme 3, the first processing unit always determines that the DCI format of a PDCCH for scheduling a PUSCH is to contain both the UL index and the DAI; or
- in a scheme 4, the first processing unit judges from a UL index condition and/or a DAI condition whether the DCI format of a PDCCH for scheduling a PUSCH is to contain the UL index and/or the DAI; and in the scheme 4:
- if a second UL index condition is satisfied, then it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
- if a second DAI condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or
- if only the second UL index condition but not the second DAI condition is satisfied, it is determined that the DCI format of a PDCCH for scheduling a PUSCH is to contain the UL index but no DAI; otherwise, it is determined that the DCI format of a PDCCH for scheduling a PUSCH is to contain the DAI but no UL index; or
- if only the second DAI condition but not the second UL index condition is satisfied, then it is determined that the DCI format of a PDCCH for scheduling a PUSCH is to contain the DAI but no UL index; otherwise, it is determined that the DCI format of a PDCCH for scheduling a PUSCH is to contain the UL index but no DAI; or
- if both the second UL index condition and the second DAI condition are satisfied, then it is determined that the DCI format of a PDCCH for scheduling a PUSCH is to contain both the UL index and the DAI; if only the second UL index condition but not the second DAI condition is satisfied, then it is determined that the DCI format of a PDCCH for scheduling a PUSCH is to contain the UL index but no DAI; if only the second DAI condition but not the second UL index condition is satisfied, then it is determined that the DCI format of a PDCCH for scheduling a PUSCH is to contain the DAI but no UL index; and if neither the second UL index condition nor the second DAI condition is satisfied, then it is determined in a predefined scheme that the DCI format of a PDCCH for scheduling a PUSCH is to contain only one of DAI and UL index bit fields; or
- if neither the second UL index condition nor the second DAI condition is satisfied, then it is determined in a predefined scheme that the DCI format of a PDCCH for scheduling a PUSCH is to contain neither DAI nor UL index;

wherein the second DAI condition is that when a downlink reference TDD uplink/downlink configuration of at least one of the aggregated carriers is of a first category of TDD uplink/downlink configurations, the DCI format of a PDCCH for scheduling a PUSCH is to contain the DAI; or the second DAI condition is that when the TDD uplink/downlink configuration of at least one of the aggregated carriers signaled in the system information is of the first category of TDD uplink/downlink configurations, the DCI format of a PDCCH for scheduling a PUSCH is to contain the DAI;

the second UL index condition is that when an uplink reference TDD uplink/downlink configuration of the at least one of the aggregated carriers is of a second category of TDD uplink/downlink configurations, the DCI format of a PDCCH for scheduling a PUSCH is to contain the UL index; or the second UL index condition is that when the TDD uplink/downlink configuration of the at least one of the aggregated carriers signaled in the system information is of the second category of TDD uplink/downlink configurations, the DCI format of a PDCCH for scheduling a PUSCH is to contain the UL index; and the first category of TDD uplink/downlink configurations refers to TDD uplink/downlink configurations in which the number of downlink sub-frames is no less than the number of uplink sub-frames, and the second category of TDD uplink/downlink configurations refers to TDD uplink/downlink configurations in which the number of downlink sub-frames is less than the number of uplink sub-frames in a radio frame.

15. The device according to claim 11, wherein further determining, by the second processing unit, according to the result of the judging, the number of transmitted bits in a DCI format of a PDCCH to be detected in the current downlink sub-frame and detecting the PDCCH according to the determined number of transmitted bits in the DCI format comprises:

determining, by the second processing unit, according to judging result of whether the DCI format of a PDCCH for scheduling a PUSCH is to contain the UL index and/or the DAI, the number of valid bits in the DCI format of a PDCCH for scheduling a PUSCH;

padding, by the second processing unit, bits in a DCI format of a PDCCH to be detected by the second processing unit in the current downlink sub-frame under a bit padding rule based upon the number of valid bits in the DCI format of a PDCCH for scheduling a PUSCH and/or the number of valid bits in each of the DCI formats of PDCCHs to be detected, and taking the number of bits in each DCI format after the bits padding as the number of transmitted bits in the corresponding DCI format; and detecting, by the second processing unit, PDCCHs according to the determined numbers of transmitted bits in the DCI formats for detection, in a common search space, and in a UE-specific search space on a carrier for which a PDCCH needs to be detected.

16. The method according to claim 2, wherein further determining, by the UE, according to the result of the judging, the number of transmitted bits in a DCI format of a PDCCH to be detected in the current downlink sub-frame, and detecting the PDCCH according to the determined number of transmitted bits in the DCI format comprises:

determining, by the UE, according to judging result of whether the DCI format of a PDCCH for scheduling a PUSCH is to contain the UL index and/or the DAI, the number of valid bits in the DCI format of a PDCCH for scheduling a PUSCH;

padding, by the UE, bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be detected, and taking the number of bits in each DCI format after the bits padding as the number of transmitted bits in the corresponding DCI format; and detecting, by the UE, PDCCHs according to the determined numbers of transmitted bits in the DCI formats for detection, in a common search space, and in a UE-specific search space on a carrier for which a PDCCH needs to be detected.

17. The method according to claim 3, wherein further determining, by the UE, according to the result of the judging, the number of transmitted bits in a DCI format of a PDCCH to be detected in the current downlink sub-frame, and detecting the PDCCH according to the determined number of transmitted bits in the DCI format comprises:

determining, by the UE, according to judging result of whether the DCI format of a PDCCH for scheduling a PUSCH is to contain the UL index and/or the DAI, the number of valid bits in the DCI format of a PDCCH for scheduling a PUSCH;

padding, by the UE, bits in a DCI format of a PDCCH to be detected by the UE in the current downlink sub-frame under a bit padding rule based upon the number of valid bits in the DCI format of a PDCCH for scheduling a PUSCH and/or the number of valid bits in each of the DCI formats of PDCCHs to be detected, and taking the number of bits in each DCI format after the bits padding as the number of transmitted bits in the corresponding DCI format; and detecting, by the UE, PDCCHs according to the determined numbers of transmitted bits in the DCI formats for detection, in a common search space, and in a UE-specific search space on a carrier for which a PDCCH needs to be detected.

18. The method according to claim 2, wherein it is judged separately for each of the aggregated carrier s of the UE whether the DCI format of a PDCCH for scheduling a PUSCH is to contain the UL index and/or the DAI in any one of the following schemes:

if a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or if a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or if only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or if only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or if both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of the DAI and the UL index bit fields; or if neither the third UL index condition nor the third DAI condition is satisfied by the carrier, then it is determined in a predefined scheme that the DCI format of a PDCCH for scheduling a PUSCH on the carrier is to contain neither DAI nor UL index;

wherein the third DAI condition is that when the downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when the TDD uplink/downlink configuration of the carrier signaled in the system information is of the first category of TDD uplink/downlink configurations, the DCI format of a PDCCH for scheduling a PUSCH on the carrier is to contain the DAI;

the third UL index condition is that when the uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and the first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

19. The method according to claim 7, wherein it is judged separately for each of the aggregated carriers of the UE whether the DCI format of a PDCCH for scheduling a PUSCH is to contain the UL index and/or the DAI in any one of the following schemes:

if a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or if a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or if only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or if only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or if both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields; or if neither the third UL index condition nor the third DAI condition is satisfied by the carrier, then it is determined in a predefined scheme that the DCI format of a PDCCH for scheduling a PUSCH on the carrier is to contain neither DAI nor UL index;

wherein the third DAI condition is that when the downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when the TDD uplink/downlink configuration of the carrier signaled in the system information is of the first category of TDD uplink/downlink configurations, the DCI format of a PDCCH for scheduling a PUSCH on the carrier is to contain the DAI;

the third UL index condition is that when the uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and the first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

20. The device according to claim 12, wherein the first processing unit judges separately for each of the aggregated carriers whether the DCI format of a PDCCH for scheduling a PUSCH is to contain the UL index and/or the DAI in any one of the following schemes:
   if a third UL index condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or
   if a third DAI condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or
   if only the third UL index condition but not the third DAI condition is satisfied by the carrier, then it is determined that the DCI format of a PDCCH for scheduling a PUSCH on the carrier is to contain the UL index but no DAI; otherwise, it is determined that the DCI format of a PDCCH for scheduling a PUSCH on the carrier is to contain the DAI but no UL index; or
   if only the third DAI condition but not the third UL index condition is satisfied by the carrier, then it is determined that the DCI format of a PDCCH for scheduling a PUSCH on the carrier is to contain the DAI but no UL index; otherwise, it is determined that the DCI format of a PDCCH for scheduling a PUSCH on the carrier is to contain the UL index but no DAI; or
   if both the third UL index condition and the third DAI condition are satisfied by the carrier, then it is determined that the DCI format of a PDCCH for scheduling a PUSCH on the carrier is to contain both the UL index and the DAI; if only the third UL index condition but not the third DAI condition is satisfied by the carrier, then it is determined that the DCI format of a PDCCH for scheduling a PUSCH on the carrier is to contain the UL index but no DAI; if only the third DAI condition but not the third UL index condition is satisfied by the carrier, then it is determined that the DCI format of a PDCCH for scheduling a PUSCH on the carrier is to contain the DAI but no UL index; and if neither the third UL index condition nor the third DAI condition is satisfied by the carrier, then it is determined in a predefined scheme that the DCI format of a PDCCH for scheduling a PUSCH on the carrier is to contain only one of DAI and UL index bit fields; or
   if neither the third UL index condition nor the third DAI condition is satisfied by the carrier, then it is determined in a predefined scheme that the DCI format of a PDCCH for scheduling a PUSCH on the carrier is to contain neither DAI nor UL index;
wherein the third DAI condition is that when the downlink reference TDD uplink/downlink configuration of the carrier is of a first category of TDD uplink/downlink configurations, the DCI format of a PDCCH for scheduling a PUSCH on the carrier is to contain the DAI; or the third DAI condition is that when the TDD uplink/downlink configuration of the carrier signaled in the system information is of the first category of TDD uplink/downlink configurations, the DCI format of a PDCCH for scheduling a PUSCH on the carrier is to contain the DAI;
the third UL index condition is that when the uplink reference TDD uplink/downlink configuration of the carrier is of a second category of TDD uplink/downlink configurations, the DCI format of a PDCCH for scheduling a PUSCH on the carrier is to contain the UL index; or the third UL index condition is that when the TDD uplink/downlink configuration of the carrier signaled in the system information is of the second category of TDD uplink/downlink configurations, the DCI format of a PDCCH for scheduling a PUSCH on the carrier is to contain the UL index; and
the first category of TDD uplink/downlink configurations refers to configurations in which the number of downlink sub-frames is no less than the number of uplink sub-frames in a radio frame, and the second category of TDD uplink/downlink configurations refers to configurations in which the number of downlink sub-frames is less than the number of uplink sub-frames in a radio frame.

* * * * *